United States Patent
Carney et al.

(10) Patent No.: US 11,462,729 B2
(45) Date of Patent: Oct. 4, 2022

(54) ELECTRODES COMPRISING COMPOSITE MIXTURES AND RELATED DEVICES AND METHODS

(71) Applicant: Massachusetts Institute of Technology, Cambridge, MA (US)

(72) Inventors: Thomas J. Carney, Cambridge, MA (US); Fikile Richard Brushett, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 225 days.

(21) Appl. No.: 16/383,525

(22) Filed: Apr. 12, 2019

(65) Prior Publication Data

US 2019/0348669 A1   Nov. 14, 2019

Related U.S. Application Data

(60) Provisional application No. 62/656,867, filed on Apr. 12, 2018.

(51) Int. Cl.
  *H01M 4/36* (2006.01)
  *H01M 4/04* (2006.01)
  *H01M 4/02* (2006.01)

(52) U.S. Cl.
  CPC .......... *H01M 4/362* (2013.01); *H01M 4/045* (2013.01); *H01M 2004/021* (2013.01)

(58) Field of Classification Search
  CPC .................. H01M 4/362; H01M 4/045; H01M 2004/021; H01M 10/36; H01M 4/16; H01M 4/14; H01M 4/139; H01M 4/043; H01M 4/13; Y02E 60/10
  See application file for complete search history.

(56) References Cited

U.S. PATENT DOCUMENTS

| | | | |
|---|---|---|---|
| 9,590,228 B1* | 3/2017 | Wang | H01M 10/054 |
| 2006/0263687 A1* | 11/2006 | Leitner | H01M 4/36 |
| | | | 429/217 |
| 2011/0070489 A1* | 3/2011 | Chiang | H01M 4/0414 |
| | | | 429/209 |
| 2016/0261005 A1* | 9/2016 | Rustomji | H01G 11/60 |
| 2019/0088972 A1* | 3/2019 | Hanafusa | H01M 8/026 |
| 2019/0198872 A1* | 6/2019 | Saruwatari | C01G 53/50 |

OTHER PUBLICATIONS

Kazim et al., Modeling of performance of PEM fuel cells with conventional and interdigitated flow fields. J Appl Electrochem. May 11, 1999;29:1409-16.

Wood et al., Effect of direct liquid water injection and interdigitated flow field on the performance of proton exchange membrane fuel cells. Electrochimica Acta. Aug. 1998;43(24):3795-809.

* cited by examiner

*Primary Examiner* — Muhammad S Siddiquee
(74) *Attorney, Agent, or Firm* — Wolf, Greenfield & Sacks, P.C.

(57) ABSTRACT

Embodiments related to electrodes comprising composite mixtures and related devices (e.g., convection batteries), systems, and methods are disclosed.

14 Claims, 18 Drawing Sheets

ELECTRODES COMPRISING COMPOSITE MIXTURES AND RELATED DEVICES AND METHODS

RELATED APPLICATIONS

This application claims priority under 35 USC 119(e) to U.S. Provisional Application No. 62/656,867, filed Apr. 12, 2018, and entitled "ELECTRODES COMPRISING COMPOSITE MIXTURES AND RELATED DEVICES AND METHODS," which is incorporated herein by reference in its entirety for all purposes.

GOVERNMENT SUPPORT

This invention was made with Government support under Grant No. FA8702-15-D-0001 awarded by the U.S. Air Force. The Government has certain rights in the invention.

FIELD

Embodiments related to electrodes comprising composite mixtures and related devices (e.g., convection batteries) and methods are disclosed.

BACKGROUND

Thick electrodes (e.g., having a thickness of at least 300 microns) find use in many applications. Many of the known methods for forming thick electrodes have challenges. For example, one method involves depositing a slurry including a liquid, active charge storage material (e.g. carbon), and a binding agent into a layer, and repeating the deposition process to build up a thick layer, e.g., to form a pellet. Issues with depositing a slurry repeatedly to make an electrode may include difficulty in introducing design features into the electrode architecture (e.g., porosity, flow channels, and other flow field design features), and repeated deposition of the slurry resulting in too-high resistance in the fabricated electrodes and/or poor adhesion between deposition layers (leading to, e.g., delamination or peeling off). Another exemplary method involves electrodepositing an active electrode material layer onto a substrate (e.g., electrodepositing an electrode material onto a carbon framework). Some issues with electrodepositing layers onto a substrate include limited control of the deposition process, limited control of surface roughness, uneven coatings resulting from uneven electric field distribution during electrodeposition, deposition of only the active material (e.g., rather than architecture-modifying materials, such as pore-forming agents), and limited types of active material that can be deposited (e.g., lithium cobalt oxide, a state-of-the-art positive electrode material, cannot be electrodeposited).

Accordingly, improved electrodes, systems, and methods are needed.

SUMMARY

The present disclosure relates to electrodes comprising composite mixtures and related devices and methods. The subject matter of the present invention involves, in some cases, interrelated products, alternative solutions to a particular problem, and/or a plurality of different uses of one or more systems and/or articles.

Certain aspects are related to electrodes. In some embodiments, an electrode is provided comprising a composite mixture. The composite mixture may include a charge storage material; a conductive material; and a binder (e.g., polymer binder) in some embodiments, the electrode comprises a porous portion and one or more channels. In some embodiments, the electrode has a thickness of between about 300 microns and about 5 cm.

In another aspect, methods are described. In some embodiments, methods of fabricating an electrode are provided. In some embodiments, a method of fabricating an electrode comprises providing a mixture. A mixture provided herein may comprise a composite mixture comprising a charge storage material and a conductive material. A mixture provided herein may comprise a pore-forming agent. In some embodiments, the method comprises compressing a mixture to form a compacted mixture. In some embodiments, the method comprises forming an electrode from the compacted mixture. In some embodiments, the electrode comprises a plurality of pores. An electrode provided herein may have a thickness of at least about 300 microns.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
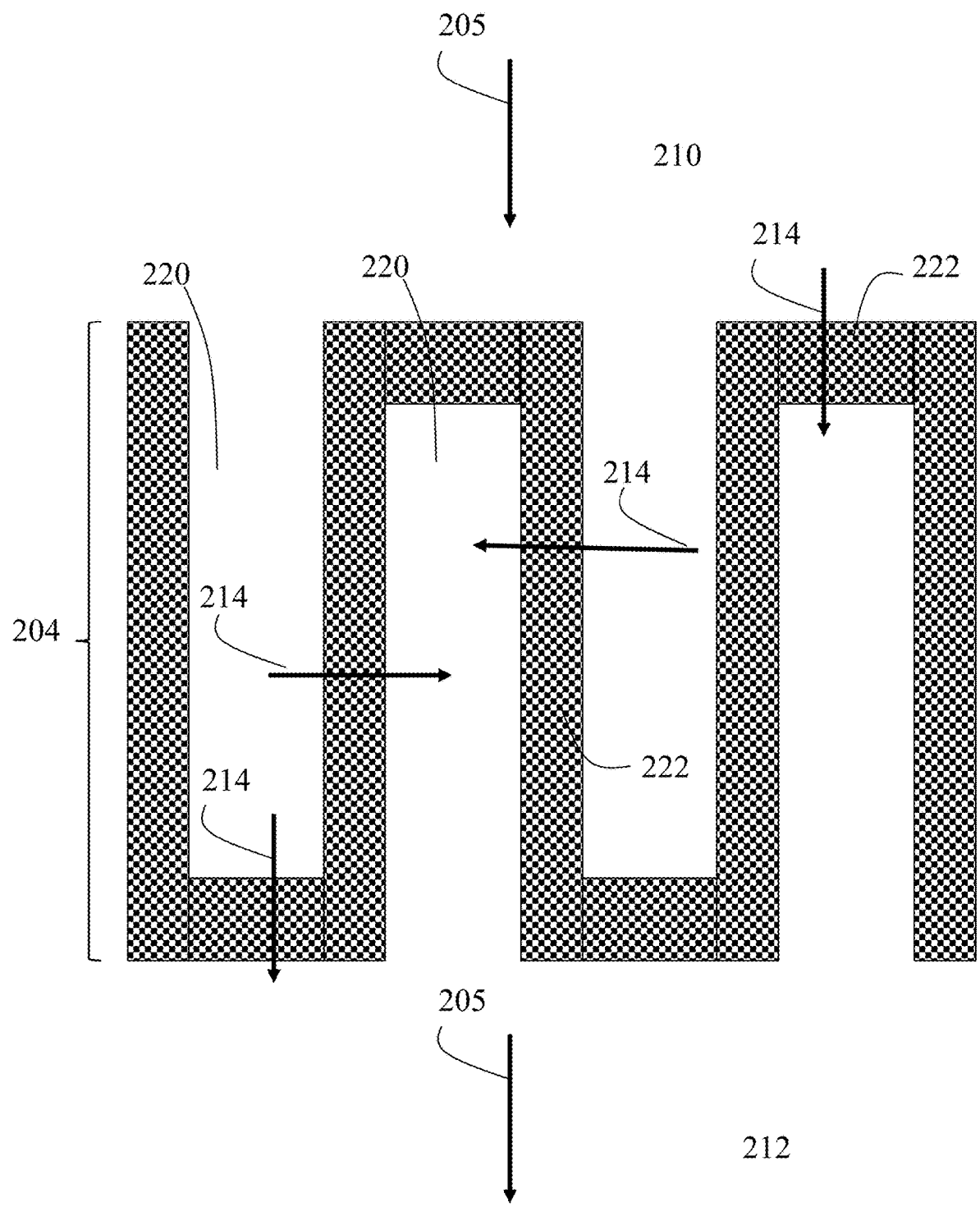
FIG. 1A-FIG. 1C and FIG. 3A-FIG. 3D show non-limiting schematics of electrode architectures, according to certain non-limiting embodiments.

Embodiments related to electrodes comprising composite mixtures and related devices (e.g., convection batteries) and methods are disclosed.

In some embodiments, an electrode is provided comprising a composite mixture. The composite mixture may comprise a charge storage material, a conductive material, and optionally, a binder (e.g., polymer binder). In some embodiments, the electrode comprises a porous portion and one or more channels. In some embodiments, the electrode has a thickness of at least about 300 microns.

In some embodiments, a method of fabricating an electrode is provided. In some embodiments, the method comprises providing a mixture comprising a pore-forming agent and a composite mixture comprising a charge storage material, a conductive material, and optionally a polymer binding. The mixture may be compressed to form a compacted mixture. A plurality of pores may be formed in the compacted mixture. In some embodiments, the composite mixture is formed by mixing together the charge storage material and the conductive material. In some embodiments, the pores are formed via removal of the pore-forming agent. In some embodiments, the electrode has a thickness of at least about 300 microns. In some embodiments, the method further comprises forming one or more channels in the electrode.

In some embodiments, the methods described herein provide many advantages over the methods known in the art. In particular, the methods described herein utilizing a composite mixture comprising a charge storage material, a conductive material, and optionally a binder (e.g., polymer binder), may provide for much greater versatility in the types of materials that can be used to form the electrode. In addition, even after fabricating the electrode using the composite mixture, the surface of the electrode (e.g., of the composite mixture) may be coated with a material by electrodeposition or by other means.

In some embodiments, the electrodes described herein and/or the electrodes formed using the methods described herein comprise electrode architectures that result in superior performance of the devices comprising the electrodes relative to other electrode architectures, especially in cases where the electrode is thick (e.g., an electrode having a thickness of at least 300 microns). For example, the electrodes may comprise an architecture that produces both high capacity accessed of and low pressure drop across an electrode and/or a device including the electrode. Such electrode architectures may include both one or more porous portions (e.g., of the composite mixture) and one or more channels configured for electrolyte flow. In some embodiments, the porosity of the one or more porous portions of the electrode and/or wetting properties of the electrolyte to the composite mixture in the electrode may play a role in the performance of devices comprising the electrode.

Without wishing to be bound by theory, when using thin electrodes (e.g., having a thickness of less than 300 microns) and/or for electrodes in a conventional battery cell having no inlet or outlet, there may be no resulting performance benefit from having porous portions in the electrode architecture (e.g., in the composite mixture) relative to having a non-porous electrode architecture. Rather, in a conventional battery cell having thin electrodes, porous portions in the electrode architecture may, in some embodiments, hinder desired adhesion of the electrode to another component of the battery serving as the substrate for the electrode. By contrast, for thick electrodes and/or for electrodes in a convection battery cell or other flow cell device, beneficial increased capacity accessed may result from having porous portions in the electrode architecture relative to having a non-porous electrode architecture.

Regarding a conventional battery cell having no inlet or outlet, in some cases, there would be no performance incentive to increase the thickness of an electrode in the conventional battery cell. Increasing the thickness of an electrode in a conventional battery cell (e.g., a lithium-ion battery cell) beyond 300 microns may result in unwanted induced convection of the electrolyte and hinder battery power performance. As an example, a rechargeable lithium-ion battery may include electrodes between or equal to 100 microns and 200 microns in thickness. If an electrode of the lithium-ion battery is too thick, the electrolyte cannot diffuse through the entire electrode, and battery performance suffers. In general, increasing the thickness of a conventional battery cell electrode beyond 300 microns may be detrimental to performance.

For the sake of clarity, various embodiments described herein are primarily directed to electrodes for convection battery cells. It should be understood that an electrode may have any suitable composition and may be used in any suitable device (e.g., energy conversion and/or energy storage device) having any suitable electrolyte as the disclosure is not so limited.

According to one aspect of this disclosure, an electrode is provided. In some embodiments, the electrode comprises a composite mixture. In some embodiments, the composite mixture comprises a charge storage material, a conductive material, and optionally a binder (e.g., polymer binder). Additional details regarding each of the components will now be described in detail.

In some embodiments of the invention, electrodes described herein may be a component of an electrochemical cell comprising at least two electrodes, an electrolyte, and a separator or membrane that physically separates one or more electrodes. In some embodiments, at least one of the electrodes comprises a composite mixture, which may comprise a charge storage material, a conductive material, a porous portion, one or more channels, and optionally, a binder (e.g., polymer binder), and may have a thickness of at least about 300 microns. In some embodiments, at least one electrode may be a conventional electrode, such as a metal, an electrode formed using an intercalation compound, or other suitable electrode material known previously in the art.

In some embodiments, the composite mixture comprises a charge storage material. In general, the charge storage material is a material that is capable of holding a charge. For example, the charge storage material may be capable of being reduced or oxidized during the operation of a device (e.g., battery) including the composite mixture. In some embodiments, the charge storage material may comprise one or more lithium metal oxides (e.g., one or more lithium transition metal oxides); one or more phosphates; one or more forms of carbon (e.g., graphite, mesocarbon microbeads); one or more metals (e.g., alkali metals, transition metals); one or more alloys; one or more transition metal complexes; one or more metalloids; one or more Prussian blue analogues; and/or one or more lithiated materials or lithium transition metal rich oxide composites including but not limited to $MnO_2$, $V_2O_5$, $LiVO_3$, $MoS_2$, $FeS_2$, S, $FeF_3$, $FeF_2$, a spinel, an olivine, a mixture of two or more olivines, a carbon-coated olivine, $LiFePO_4$, $LiCoO_2$, $LiNiO_2$, $LiNi_{1-x}Co_yM^4_zO_2$, $LiMn_{0.5}Ni_{0.5}O_2$, $Li_{1+x}Mn_{2-z}M^4_yO_{4-m}X^1_n$, $LiFe_{1-z}M^6_yPO_{4-m}X^1_n$, $LiMn_{1/3}Co_{1/3}Ni_{1/3}O_2$, $LiMn_2O_4$, $LiFeO_2$, $LiM^4_{0.5}Mn_{1.5}O_4$, $Li_{1+x}Ni_\alpha Mn_\beta Co_\gamma M^5_\delta O_{2-z''}F_{z'''}$, $Li_2MnO_3$-$Li_aM_bM'_cM''_dO_e$, $Li_n.B^1_2(M^2O_4)_3$, $Li_2MSiO_4$, or a mixture of any two or more thereof, wherein $M^2$ is P, S, Si, W, or Mo; $M^4$ is Al, Mg, Ti, B, Ga, Si, Ni, or Co; $M^5$ is Mg, Zn, Al, Ga, B, Zr, or Ti; A is Li, Ag, Cu, Na, Mn, Fe, Co, Ni, Cu, or Zn; $M^6$ is Al, Mg, Ti, B, Ga, Si, Ni, Mn or Co; M, M', and M" are transition metals; $B^1$ is Ti, V, Cr, Fe, or Zr; $X^1$ is S or F; $0 \le x \le 0.3$; $0 \le y \le 0.5$; $0 \le z \le 0.05$; $0 \le m \le 0.5$; $0 \le n \le 0.5$; $0 \le x'' \le 0.4$; $0 \le a \le 2$; $0 \le b \le 1$; $0 \le c \le 1$; $0 \le d \le 1$; $0 \le \alpha \le 1$; $0 \le \beta \le 1$; $0 \le \gamma \le 1$; $0 \le \delta \le 0.4$; $0 \le z'' \le 0.4$; $0 \le n' \le 3$; $0 < a+b+c+d < 6$; $0 < e \le 4$; and $0 < \alpha + \beta + \gamma + \delta$; or a combination thereof. In some embodiments, a spinel is a spinel manganese oxide of formula of $Li_{1+x}Mn_{2-z}M^6_yO_{4-m}X^1_n$, wherein $M^4$ is Al, Mg, Ti, B, Ga, Si, Ni, or Co; $X^1$ is S or F; $0 \le x \le 0.3$; $0 \le y \le 0.5$; $0 \le z \le 0.5$; $0 \le m \le 0.5$; and $0 \le n \le 0.5$. In some embodiments, an olivine has the formula $LiFe_{1-z}M^6_yPO_{4-m}X^1_n$; wherein $M^6$ is Al, Mg, Ti, B, Ga, Si, Ni, Mn or Co; $X^1$ is S or F; $0 \le x \le 0.3$; $0 \le y \le 0.5$; $0 \le z \le 0.5$; $0 \le m \le 0.5$; and $0 \le n \le 0.5$. In some embodiments, the charge storage material comprises one type of material, or two types of material, or three types of material, or four types of materials, or more. Non-limiting examples of lithium metal oxides include lithium oxide, lithium cobalt oxide, lithium nickel oxide, or lithium manganese oxide, or a combination thereof. Non-limiting examples of phosphates include lithium metal phosphates (e.g., lithium transition metal phosphates), including but not limited to lithium iron phosphate, lithium nickel phosphate, or lithium cobalt phosphate, or a combination thereof. Non-limiting examples of forms of carbon include carbon black, graphene, graphite, mesocarbon microbeads, carbon nanotubes, or buckminsterfullerene, or a combination thereof. Non-limiting examples of metals include alkali metals (e.g., lithium, sodium), transition metals (e.g., iron, manganese, cobalt, vanadium), or a combination thereof. Non-limiting examples of metalloids include silicon, germanium, or tellurium, or a combination thereof. In some embodiments, a Prussian blue analog has the chemical formula $M_{1-2x}Co_{1+x}[Fe(CN)_6] \cdot zH_2O$, where x and z are variables (z may be zero and x may depend upon the state of charge of the charge storage material) and M is an alkali metal (e.g., sodium, lithium). In certain embodiments, the charge storage material (e.g., for sodium ion batteries) comprises a transition metal complex, for example, sodium manganese hexacyanomanganate $Mn^{II}Na_2[Mn^{II}(CN)_6]$ or sodium copper hexacyanoferrate $Cu^{II}Na_2[Fe^{II}(CN)_6]$. Examples of a half-cell reaction for an electrode comprising a charge storage material include but are not limited to: $Mn^{II}Na[Mn^{III}(CN)_6]+Na^++e^-$ yields $Mn^{II}Na_2[Mn^{II}(CN)_6]$, with reduction potential 0.052 V vs. standard hydrogen electrode (SHE); and $Cu^{II}Na[Fe^{III}(CN)_6]+Na^++e^-$ yields $Cu^{II}Na_2[Fe^{II}(CN)_6]$ with reduction potential 0.982 V vs. SHE.

In some embodiments, the composite mixture comprises at least 0.1 wt %, at least 0.5 wt %, at least 1 wt %, at least 2 wt %, at least 4 wt %, at least 8 wt %, at least 10 wt %, at least 20 wt %, at least 30 wt %, at least 40 wt %, or at least 50 wt % of the charge storage material versus the total weight of the composite mixture. In some embodiments, the composite mixture may comprise less than or equal to about 99.8 wt %, less than or equal to about 99 wt %, less than or equal to about 90 wt %, less than or equal to about 80 wt %, less than or equal to about 70 wt %, or less than or equal to about 60 wt % of the charge storage material versus the total weight of the composite mixture. Combinations of the above-referenced ranges are also possible (e.g., between or equal to 0.1 wt % and 99 wt %, or between or equal to 30 wt % and 70 wt %, or between or equal to 40 wt % and 99.8 wt %, between or equal to 80 wt % and 99.8 wt %, or between or equal to 40 wt % and 60 wt %, or between or equal to 45 wt % and 55 wt %, versus the total weight of the composite mixture). In certain embodiments, the composite mixture comprises between or equal to 40 wt % and 99.8 wt % of the charge storage material versus the total weight of the composite mixture. In certain embodiments (e.g., in aqueous batteries), the composite mixture comprises between or equal to 50 wt % and 99.8 wt % of the charge storage material versus the total weight of the composite mixture. In certain embodiments (e.g., in non-aqueous batteries), the composite mixture comprises between or equal to 80 wt % and 99.8 wt % of the charge storage material versus the total weight of the composite mixture. However, embodiments in which weight percentages of the charge storage material in the composite mixture, versus the total weight of the composite mixture, are larger or smaller than those weight percentages noted above are also contemplated as the disclosure is not so limited.

In some embodiments, the composite mixture of the electrode comprises a conductive material. Generally, the conductive material is a material which has a resistivity below 1 ohm-meter. In some embodiments, the conductive material does not participate in any electrochemical reactions occurring in a device (e.g., battery) comprising the conductive material, the conductive material is inert, and the conductive material functions to increase the conductivity of the composite material. In some embodiments, the conductive material has a surface area of greater than 10 $m^2$ per gram. In some embodiments, the conductive material may comprise one or more noble metals (e.g., gold, platinum), aluminum, one or more transition metals, or alloys of any of these metals, and/or one or more forms of carbon (e.g., carbon black comprising carbon nanomaterials and/or electrically conductive carbon nanotubes), or a combination thereof. Non-limiting examples of forms of carbon include carbon black, graphene, graphite, mesocarbon microbeads, carbon nanotubes, or buckminsterfullerene, or a combination thereof. Non-limiting examples of transition metals include iron, manganese, cobalt, or vanadium, or a combination thereof. In some embodiments, the charge storage material comprises one type of material, or two types of material, or three types of material, or four types of materials, or more. In certain embodiments, the conductive material comprises carbon black. In some embodiments, the composite mixture may comprise at least 0.1 wt %, at least 0.5 wt %, at least 1 wt %, at least 2 wt %, at least 4 wt %, at least 8 wt %, at least 10 wt %, at least 15 wt %, at least 20 wt %, at least 25 wt %, or at least 30 wt % of the conductive material, versus the total weight of the composite mixture. In some embodiments, the composite mixture may comprise at most 99 wt %, at most 90 wt %, at most 80 wt %, at most 70 wt %, at most 60 wt %, at most 50 wt %, or at most 40 wt % of the conductive material, versus the total weight of the composite mixture. Combinations of the above-referenced ranges are also possible (e.g., between or equal to 0.1 wt % and 99 wt %, between or equal to 5 wt % and 25 wt %, between or equal to 1 wt % and 10 wt %, between or equal to 1 wt % and 30 wt %, between or equal to 1 wt % and 25 wt %, between or equal to 0.1 wt % and 30 wt %, between or equal to 10% and 40%, or between or equal to 20 wt % and 30 wt %, versus the total weight of the composite mixture). In certain embodiments, the composite mixture comprises between or equal to 0.1 wt % and 30 wt % of the conductive material versus the total weight of the composite mixture. In certain embodiments (e.g., in aqueous batteries), the composite mixture comprises between or equal to 5 wt % and 25 wt % of the conductive material versus the total weight of the composite mixture. In certain embodiments (e.g., in non-aqueous batteries), the composite mixture comprises between or equal to 1 wt % and 10 wt % of the conductive material versus the total weight of the composite mixture. However, embodiments in which weight percentages of the conductive material in the composite mixture, versus the total weight of the composite mixture, are larger or smaller than those weight percentages noted above are also contemplated as the disclosure is not so limited.

In some embodiments, the composite mixture of the electrode comprises a binder (e.g., a polymer binder). In some embodiments, the binder is soluble (e.g., to at least 5 weight percent of binder in the solution) in a suitable solvent for processing the binder (e.g., water, n-methyl-2-pyrrolidone). In some embodiments, the composite mixture of the electrode comprises a polymer binder. In some embodiments, the polymer binder has a molecular weight between or equal to 200,000 g per mole and 2,000,000 g per mole (e.g., between or equal to 500,000 g per mole and 2,000,000 g per mole, between or equal to 1,000,000 g per mole and 2,000,000 g per mole, between or equal to 500,000 g per mole and 700,000 g per mole, 600,000 g per mole). In some embodiments, the polymer binder has a density of between or equal to 1 g/cm$^3$ and 2 g/cm$^3$ (e.g., between or equal to 1.77 g/cm$^3$ and 1.79 g/cm$^3$, between or equal to 1.74 g/cm$^3$ and 1.77 g/cm$^3$, between or equal to 1.2 g/cm$^3$ and 1.52 g/cm$^3$). In some embodiments, the binder is a polymer binder. In some embodiments, the polymer binder may comprise one or more thermoplastic polymers (e.g., polyvinylidene fluoride (PVDF), polytetrafluoroethylene (PTFE), polyvinyl alcohol (PVA), and/or polystyrene sulfonate (PSS), or a combination thereof). In some embodiments, the polymer binder comprises polyvinylidene fluoride (PVDF), polytetrafluoroethylene (PTFE), polyvinyl alcohol (PVA), polystyrene sulfonate (PSS), poly(acrylonitrile), polyethylene, polystyrene, polyethylene oxide, a polyimide, a styrene-butadiene rubber, carboxymethyl cellulose, gelatin, or a copolymer of any two or more such polymers, or a combination thereof. In certain embodiments, the polymer binder comprises PVDF. In some embodiments, the binder (e.g., polymer binder) encourages wetting of the electrode material by the electrolyte and/or facilitates ion transport. In some embodiments, the binder comprises an inorganic material (e.g., cement, glass, calcium carbonate, calcium oxide, calcium hydroxide). In some embodiments, the composite mixture may comprise at least 0.1 wt %, at least 0.5 wt %, at least 1 wt %, at least 2 wt %, at least 4 wt %, at least 8 wt %, at least 10 wt %, at least 15 wt %, at least 20 wt %, at least 25 wt %, or at least 30 wt % of the binder versus the total weight of the composite mixture. In some embodiments, the composite mixture may comprise at most 99 wt %, at most 90 wt %, at most 80 wt %, at most 70 wt %, at most 60 wt %, at most 50 wt %, or at most 40 wt % of the binder versus the total weight of the composite mixture. Combinations of the above-referenced ranges are also possible (e.g., between or equal to 0.1 wt % and 99 wt %, between or equal to 1 wt % and 50 wt %, between or equal to 5 wt % and 25 wt %, between or equal to 1 wt % and 10 wt %, between or equal to 1 wt % and 30 wt %, between or equal to 1 wt % and 25 wt %, between or equal to 0.1 wt % and 30 wt %, between or equal to 10% and 40%, between or equal to 20 wt % and 30 wt %). In certain embodiments, the composite mixture comprises between or equal to 0.1 wt % and 30 wt % of the binder versus the total weight of the composite mixture. In certain embodiments (e.g., in aqueous batteries), the composite mixture comprises between or equal to 5 wt % and 25 wt % of the binder versus the total weight of the composite mixture. In certain embodiments (e.g., in non-aqueous batteries), the composite mixture comprises between or equal to 1 wt % and 10 wt % of the binder versus the total weight of the composite mixture. However, embodiments in which weight percentages of the binder in the composite mixture are larger or smaller than those weight percentages noted above are also contemplated as the disclosure is not so limited.

In some embodiments, the composite mixture comprises between 30 wt % and 70 wt % of a charge storage material, between 10 wt % and 40 wt % of a conductive material, and between 10 wt % and 40 wt % of a binder, wherein the wt % are versus the total weight of the composite mixture. In some embodiments, the composite mixture comprises between 40 wt % and 60 wt % of a charge storage material, between about 20 wt % and 30 wt % of a conductive material, and between about 20 wt % and 30 wt % of a pore-forming agent, wherein the wt % are versus the total weight of the composite mixture. In some cases, the conductive material is a Prussian blue analog (e.g., sodium manganese hexacyanomanganate $Mn^{II}Na_2[Mn^{II}(CN)_6]$ or sodium copper hexacyanoferrate $Cu^{II}Na_2[Fe^{II}(CN)_6]$. In some cases, the conductive material is a form of carbon (e.g., carbon black). In some cases, the binder is a thermoplastic polymer (e.g., PVDF).

The weight ratio of a charge storage material, a conductive material, and/or a binder in a composite mixture may be adjusted based upon the other components of the device (e.g., the electrolyte composition). In a non-limiting embodiment, the composite mixture comprises about 50 wt % Prussian blue analogue, about 25 wt % carbon black, and about 25 wt % polyvinylidene fluoride (PVDF), versus the total weight of the composite mixture.

Additional details regarding the electrode architecture will now be described. In some embodiments, an electrode described herein or formed by the methods described herein comprises a porous portion (e.g., the composite mixture is porous) and one or more channels (e.g., formed in the composite mixture). Without wishing to be bound by theory, electrode configurations comprising channels and porous portions as described herein may provide improvements over a commonly used packed bed electrode configuration (e.g., generally comprises a porous portion, but not including any channels). In a packed bed electrode configuration (e.g., FIG. 3A), an electrolyte may be forced through the packed bed, which can present issues including a high pressure drop or high resistance across the electrode. In some embodiments of the present disclosure, the majority of the electrolyte flowing through the electrode runs through pores in the porous portions of the electrode and/or through channels in the electrode, thus reducing the pressure drop or resistance across the electrode.

In some embodiments, the electrode architectures disclosed herein may improve performance of a device (e.g., convection battery cell) comprising the electrode as compared to conventional electrode architectures. In some embodiments described herein, performance improvements include a higher theoretical percent of capacity accessed relative to alternative configurations. For example, in some embodiments, capacity accessed is between or equal to 50% and 100%; by contrast, capacity accessed in some alternative configurations is between or equal to 10% and 30% (e.g., 24%). In some embodiments, a device comprising an electrode described herein has a capacity accessed of at least 50%, at least 55%, at least 60%, at least 65%, at least 70%, at least 75%, or at least 80%. In some embodiments, the theoretical percent of capacity accessed is determined by discharging/charging a device (e.g., a battery) comprising an electrode described herein at a low rate (e.g., between or equal to C/3 to C/10 corresponding to a 3 hour or 10 hour discharge respectively), measuring the total amount of electrons passed to the device, and then charging the battery and measuring the total amount of electrons removed from the device. In some embodiments, a potentiostat is used to carry this testing of a device comprising an electrode described herein by measuring the current during the device operation. The number of electrons may then be compared with the theoretical amount the device should store based on the mass of an electrode (described herein) in the device. In some embodiments, a device comprising an electrode described herein is able to access at least 40%, at least 50%, at least 60%, at least 70%, at least 80%, at least 90%, at least 95%, or at least 99% of the theoretical capacity of the device. In some embodiments, a device comprising an electrode described herein may have a charge capacity of between or equal to 20 mAh/g and 40 mAh/g, and/or a discharge capacity of between or equal to 20 mAh/g and 40 mAh/g (see, e.g., FIG. 7B). Features of the electrode architecture resulting in a low pressure drop may also lower capacity accessed for the device. In some embodiments, the pressure drop is determined by placing a pressure gauge before the inlet to a device comprising an electrode described herein and at the exit of the device. The pressure may then be determined by subtracting the exit from the inlet pressure gauge. In some embodiments, wherein one channel of width approximately 0.159 cm is included in an electrode (e.g., a pellet), the pressure drop is reduced to 3 mbar (e.g., from 1 bar in an alternative configuration where no channels are included in the electrode). In some embodiments, wherein 3 channels of width approximately 0.159 cm are included in an electrode, the pressure drop is 2 mbar (e.g., from one bar in a configuration wherein no channels are included; this is approximately a 3 order of magnitude decrease). Other advantages of using certain combinations of porous portions and channels in an electrode architecture may include a lower overpotential (e.g., thermodynamic voltage loss), which may directly result in a higher voltaic efficiency (e.g., of at least 70%) of a device that includes an electrode described herein. In some embodiments, the overpotential measurement for a device comprising an electrode described herein is dependent on the current drawn as well as the state of charge of the device. The overpotential may be determined by setting a current to achieve a C/3 discharge rate (3 hour discharge) and then measuring the discharge voltage at 50% state of charge. This discharge voltage value may then be subtracted from the open circuit voltage (no current applied) at 50% state of charge to determine the overpotential. In some embodiments, the voltaic efficiency is obtained for a device comprising an electrode described herein instead of the overpotential as an efficiency metric, e.g., because the voltaic efficiency may be more straightforward to calculate. In embodiments where the electrode is thick (e.g., having a thickness of at least 300 microns), therefore having a higher resistance than thinner electrodes, electrode embodiments herein may have a lower resistance and a higher capacity accessed relative to electrodes of the same thickness having a different architecture. The electrical resistance of an electrode described herein may be measured using a 2 or 4 probe point measurement. The electrical resistance of a device comprising an electrode described herein may be determined by determining the overpotential of the device and then dividing by the current through the device.

In some embodiments, a device (e.g., a convection battery cell) comprising an electrode described herein may last (e.g., may maintain at least 90% relative to the initial capacity accessed) for at least one year. In some embodiments, the voltaic efficiency (related to the overpotential) of a device comprising an electrode described herein is at least 70% (e.g., FIG. 7A), compared with 40% in devices with alternative electrode configurations. In some embodiments, the voltaic efficiency of a device comprising an electrode described herein is at least 70%, at least 72%, at least 74%, at least 76%, at least 78%, at least 80%, at least 82%, or at least 84%. In some embodiments, the voltaic efficiency of a device (e.g., battery) comprising an electrode described herein is determined using the equation: CE*VE=EE, where CE is the Coulombic efficiency, VE is the voltaic efficiency, and EE is the energy efficiency. The term "Coulombic efficiency" will be known to those of skill in the art and may be equal to the amount of charge released from the device during discharge divided by the total amount of charge stored in the device during charge, with units Coulomb/Coulomb. The term "energy efficiency" will be known to those of skill in the art and may be equal to the amount of energy released from the device during discharge divided by the total amount of energy stored in the device during charge, with units Joule/Joules. In some embodiments, Coulombic efficiency is a measure of the efficiency of the charge storage material, voltaic efficiency is a measure of the efficiency of a device (e.g., a convection battery cell; e.g., related to electrode design, transport through the device), and energy efficiency is a measure of the efficiency of the whole system (e.g., a convection battery). In some embodiments, the Coulombic efficiency of the device is at least 95% (e.g., FIG. 7A). In some embodiments, the Coulombic efficiency of a device comprising an electrode having channels described herein is at least 95% (e.g., FIG. 7A), compared with a Coulombic efficiency of at most 82% (e.g., FIG. 6A) for a device comprising an electrode lacking channels. The Coulombic efficiency of the device may be at least 96%, at least 97%, at least 98%, or at least 99%. The capacity accessed for the device may be, e.g., at least 50%.

In some embodiments, an electrode comprising or formed using a composite mixture described herein may have an architecture including a porous portion (e.g., a nanoporous portion) and one or more channels. For example, in some embodiments, the electrode comprises a composite mixture, wherein the composite mixture is porous, and one or more channels are formed in the composite mixture. The one or more channels may be designed to allow electrolyte for flow in a specific manner for a given device chemistry (e.g., battery chemistry) and/or for a given application. In some embodiments, the electrode comprises a three-dimensional architecture configured for electrolyte flow with high capacity accessed (an energy storage performance metric of a battery including the electrode) and low pressure drop (which may increase the lifetime of a device including the electrode and/or decrease the energy required to run electrolyte through the electrode).

In some embodiments, the electrode comprises a porous portion. In some cases, the composite mixture forms the porous portion. In some embodiments, the porous portion comprises a nanoporous portion, having pores with an average size (e.g., diameter, width) of less than about 1 micron. In some embodiments, the porous portion comprises a nanoporous portion having pores with an average pore size of greater than about 1 nm and less than about 50 nm (e.g., pore 950 in FIG. 5). In some embodiments, the porous portion comprises a nanoporous portion having pores with an average pore size of between or equal to 50 nm and 500 nm (e.g., pore 952 in FIG. 5). For example, in embodiments where the pores are spherical, average pore size may be determined by the number average diameter of the pores. In embodiments where the pores are oblong or of an irregular shape, average pore size may be determined by the number average diameter of a plurality of pores, wherein each pore is first calculated to have an equivalent sphere with a diameter equal to the average diameter of the oblong shaped pore. The average pore size of a porous portion may be measured according to any method known in the art. For example, the average pore size may be determined by image analysis, e.g., of scanning electron microscopy images. In some embodiments, the porous portion comprises a microporous portion having pores larger than 2 microns in size of less than 10 microns in size, through which a fluid may flow more readily than through a nanoporous portion. In some embodiments, the porous portion comprises a nanoporous portion having pores with an average size of greater than about 1 nm and less than about 50 nm, and a microporous portion having pores larger than 2 microns in size and less than 10 microns in size. In some embodiments, the porous portion comprises open pores that are fluidly connected with one another, which may facilitate a reduced pressure drop through the electrode than a comparable electrode comprising closed pores that are fluidly isolated from one another. In some embodiments, the porous portion comprises closed pores that are fluidly isolated from one another, which may force electrolyte to penetrate the electrode in a device configuration and therefore increase the capacity accessed. In some embodiments, the porous portion comprises both open pores and closed pores (e.g., which may aid in balancing the competing considerations of pressure drop and capacity access).

Figure 3A:
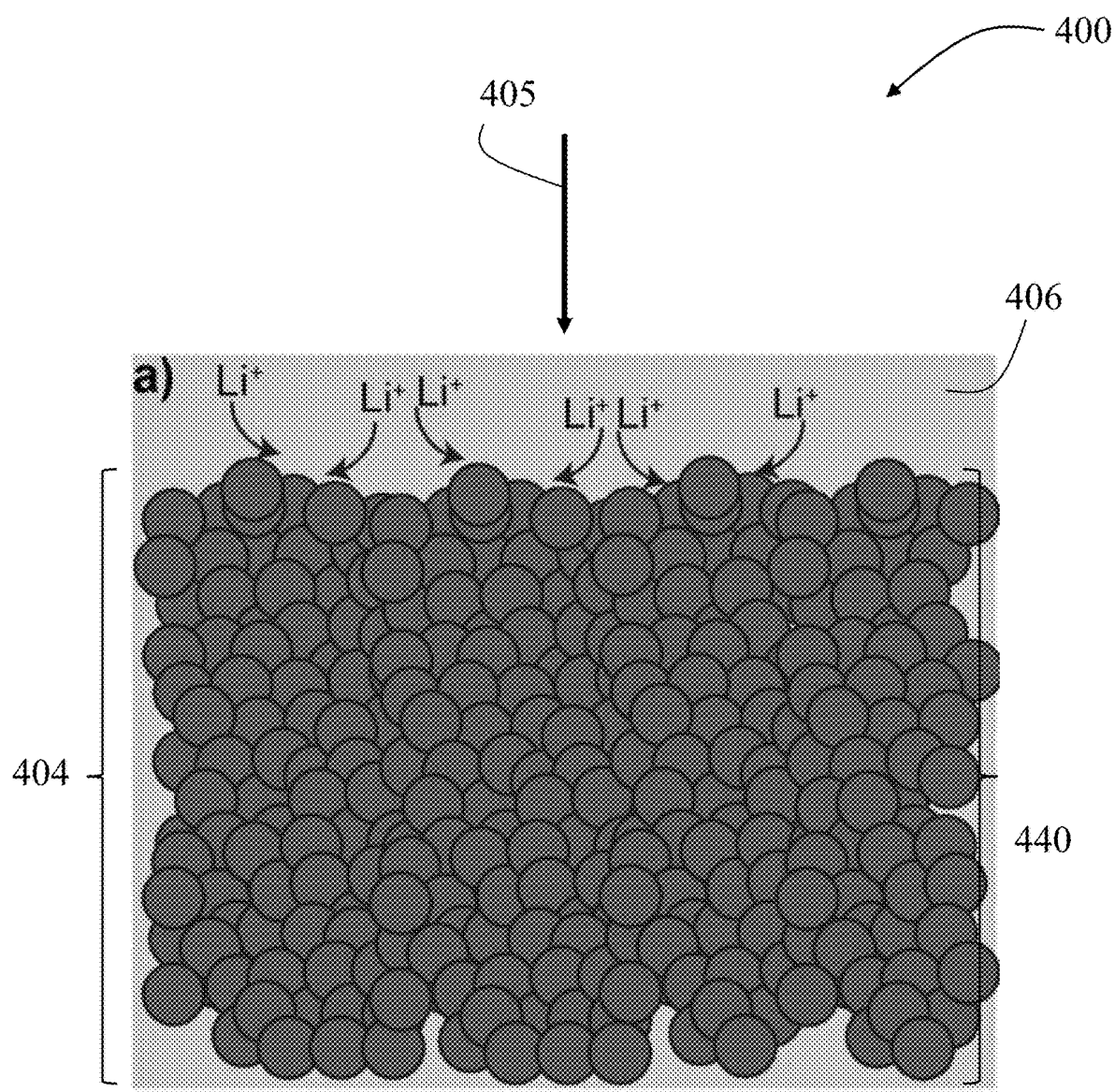
Figure 3B:
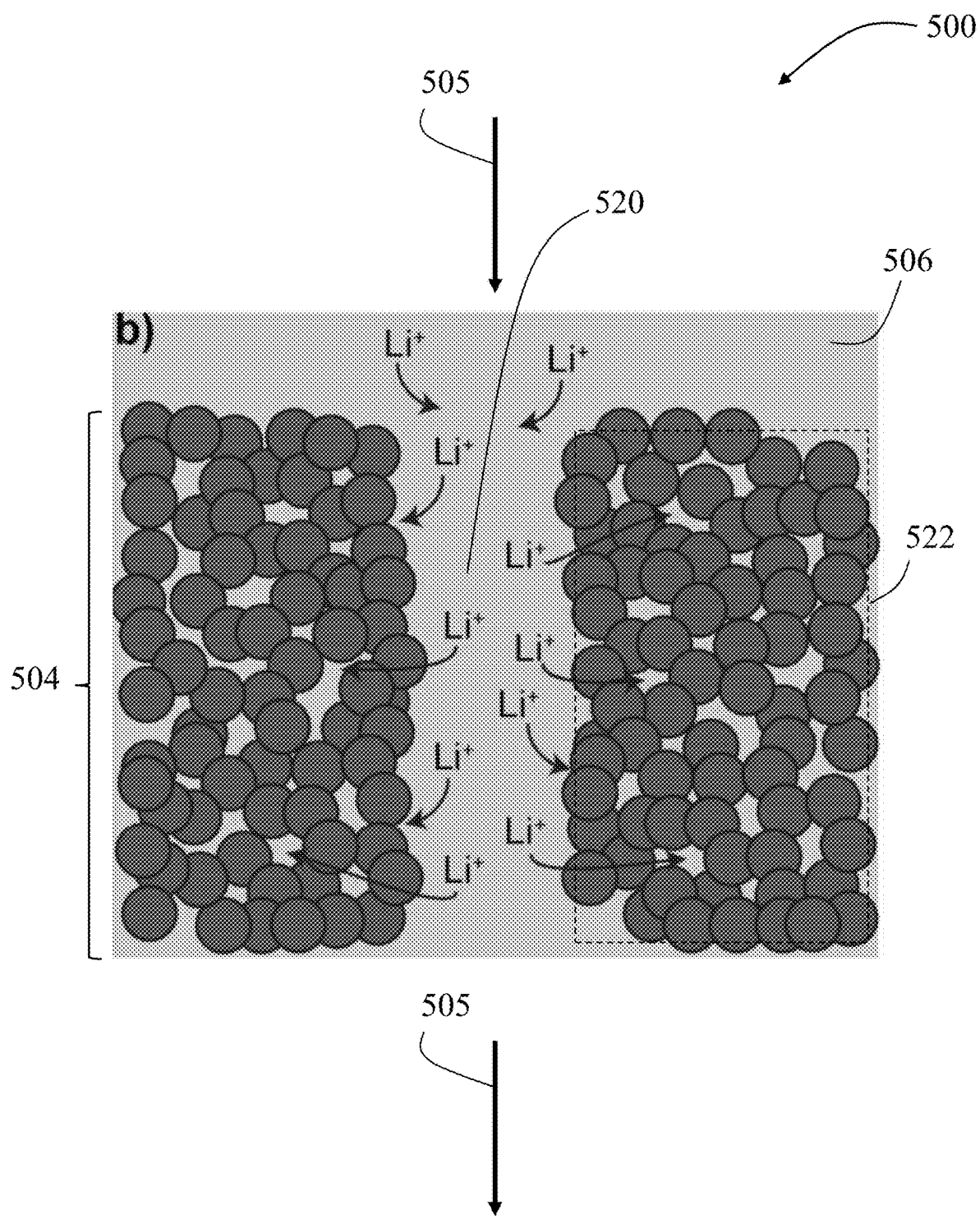
Figure 3C:
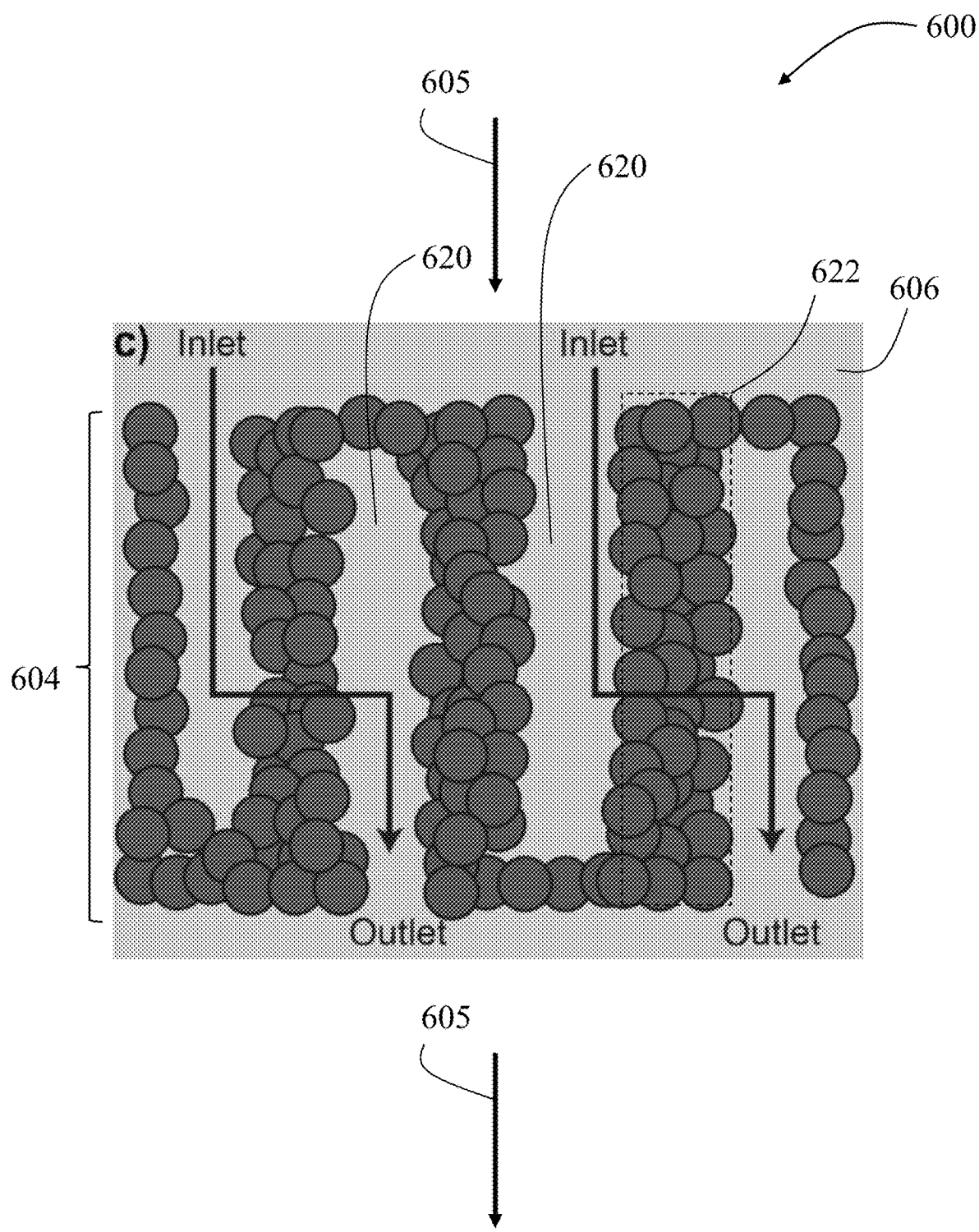

In some embodiments, the electrode comprises one or more channels. In some embodiments, an increase in the number of channels in an electrode may improve the electrode's performance and/or the overall performance of a cell in which the electrode is used. In some embodiments, the one or more channels occupy between or equal to 0.25% and 5% of the total surface area of the largest surface of the electrode (e.g., the surface area determine by length×width, when the electrode is rectangular prism or cube; or the surface area determined by pi×radius$^2$, when the electrode is a cylinder). In some embodiments, the one or more channels occupied between or equal to 0.25% and 5% of the volume of the electrode (e.g., wherein the volume is determine by length×width×thickness, when the electrode is rectangular prism or cube; or the surface area determined by pi×radius$^2$× thickness, when the electrode is a cylinder). In some embodiments, the one or more channels penetrate through the entire thickness of the electrode (e.g., the pellet). In some embodiments, the one or more channels each have a width (e.g., diameter) of between or equal to approximately 0.079 cm and approximately 0.318 cm (e.g., channel 920 in FIG. 5). In some embodiments, the one or more channels each have a width (e.g., diameter) of approximately 0.159 cm. In some embodiments, the electrode comprises between or equal to 1 channel and 10 channels (e.g., electrode 804 in FIG. 4). In some embodiments, the electrode comprises channels with a uniform spacing between the channels (e.g., electrode 804 in FIG. 4). In some embodiments, the electrode has a cylindrical shape (e.g., electrode 804 in FIG. 4). In some embodiments, the electrode is cylindrical and has a diameter of between or equal to 0.254 cm and 25.4 cm and a thickness (height of the cylinder) of between or equal to 300 microns and 10 mm. In some embodiments, the electrode is cylindrical and has a diameter of 2.54 cm and a thickness (height of the cylinder) of between or equal to 1 mm and 10 mm. The one or more channels may be configured to result in higher electrode capacity accessed (e.g. FIG. 9A and FIG. 9B), lower pressure drop per unit length (e.g. FIG. 8B), and/or increased power performance (e.g., relative to other configurations of convection battery cells) by enhanced mass transport (e.g., from the electrolyte to the charge storage material and vice versa) as compared to conventional electrodes. In some embodiments, the one or more channels form an interdigitated flow field architecture, which increases the overall surface area of the electrode that the electrolyte is exposed to, yet still allows for the electrolyte to flow through a portion of the electrode (e.g., the porous section comprising the composite mixture). For example, the electrode may comprise a plurality of channels that penetrate a significant portion of the electrode thickness, but which are closed at one end of the channel. For example, FIG. 3B shows a channel 520 that runs the entire length of the electrode, and is not closed at one end of the channel, and thus the electrolyte can flow through the electrode without necessarily flowing through any portion of the porous composite mixture. In contrast, each channel (e.g., 620) in FIG. 3C is closed at one end, thus the electrolyte not only flows through the channels, but also flows through at least a portion of the composite mixture. In some embodiments, the number of channels may enhance the average permeability of the electrode (e.g. FIG. 8A).

Figure 1B:
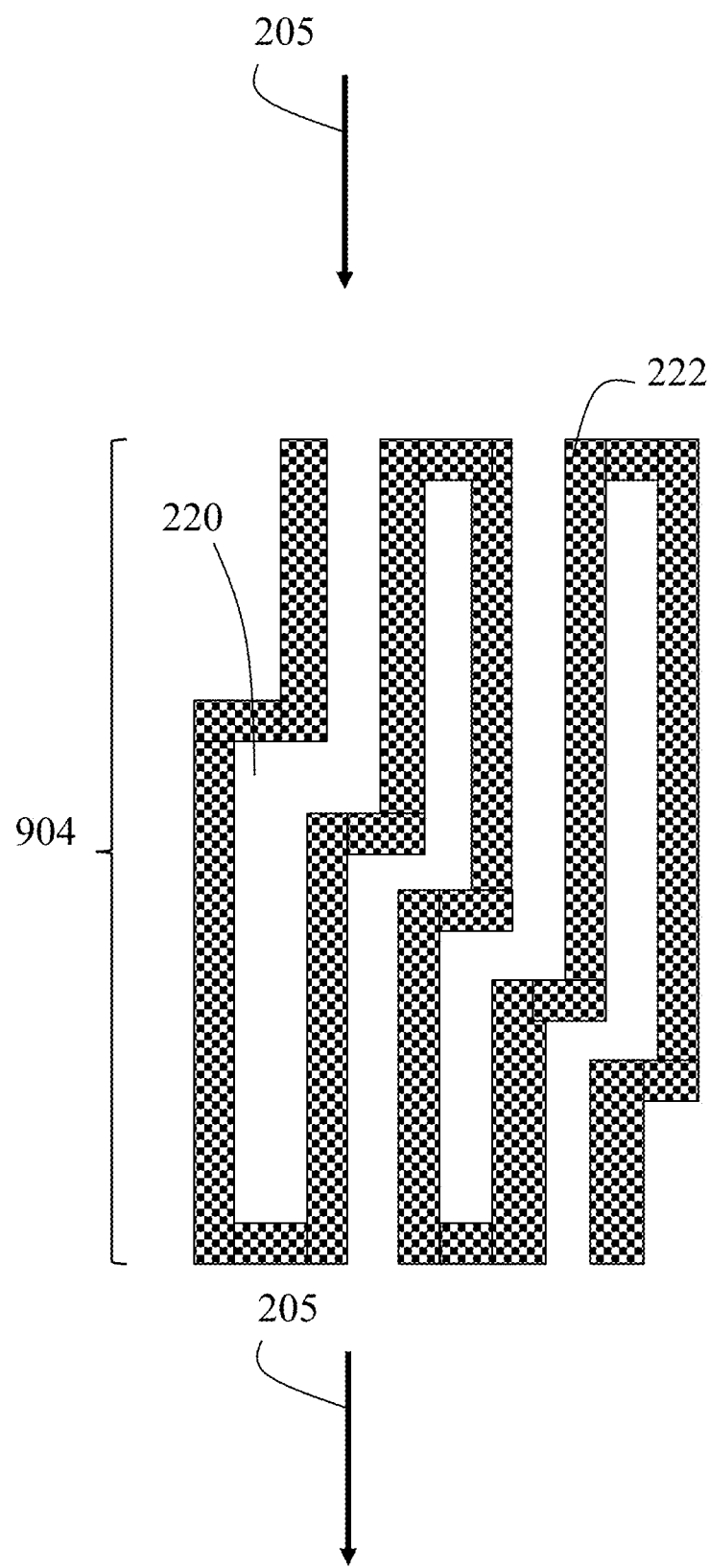

FIG. 1A shows a non-limiting channel architecture of an electrode 222 comprising a composite mixture. The composite mixture is porous. The electrode comprises a plurality of channels 220, arranged in an interdigitated architecture. The electrolyte generally flows through the electrode in electrolyte flow direction 205. The pressure drop may be calculated based on total length of the electrode (e.g., length 204). In order for the electrolyte to flow from area 210 to area 212 across the electrode, the electrolyte must pass through a least a portion of the porous portion of the electrode (e.g., shown by arrows 214). FIG. 1B shows another non-limiting schematic of an alternative architecture.

Figure 1C:
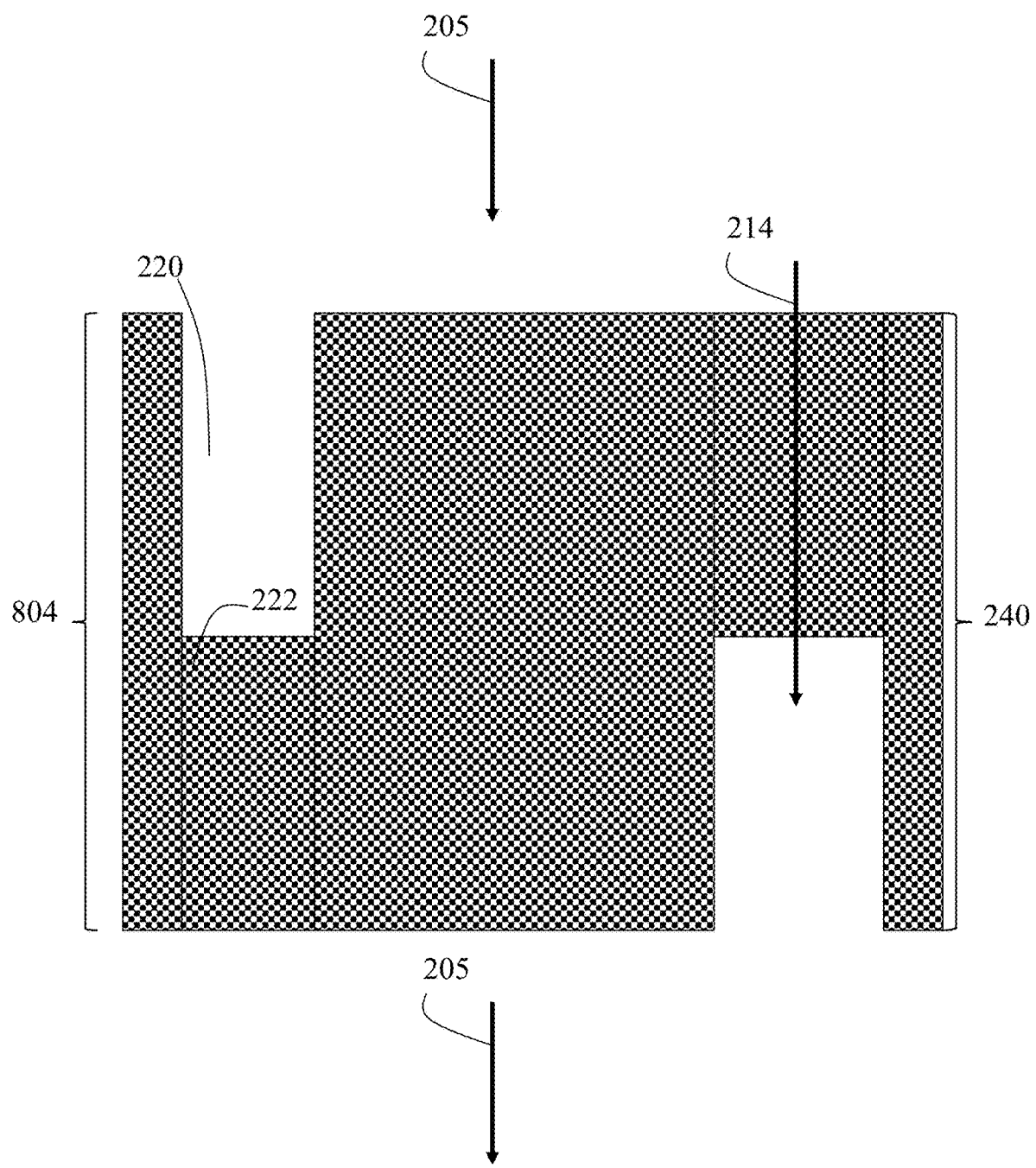
Figure 3D:
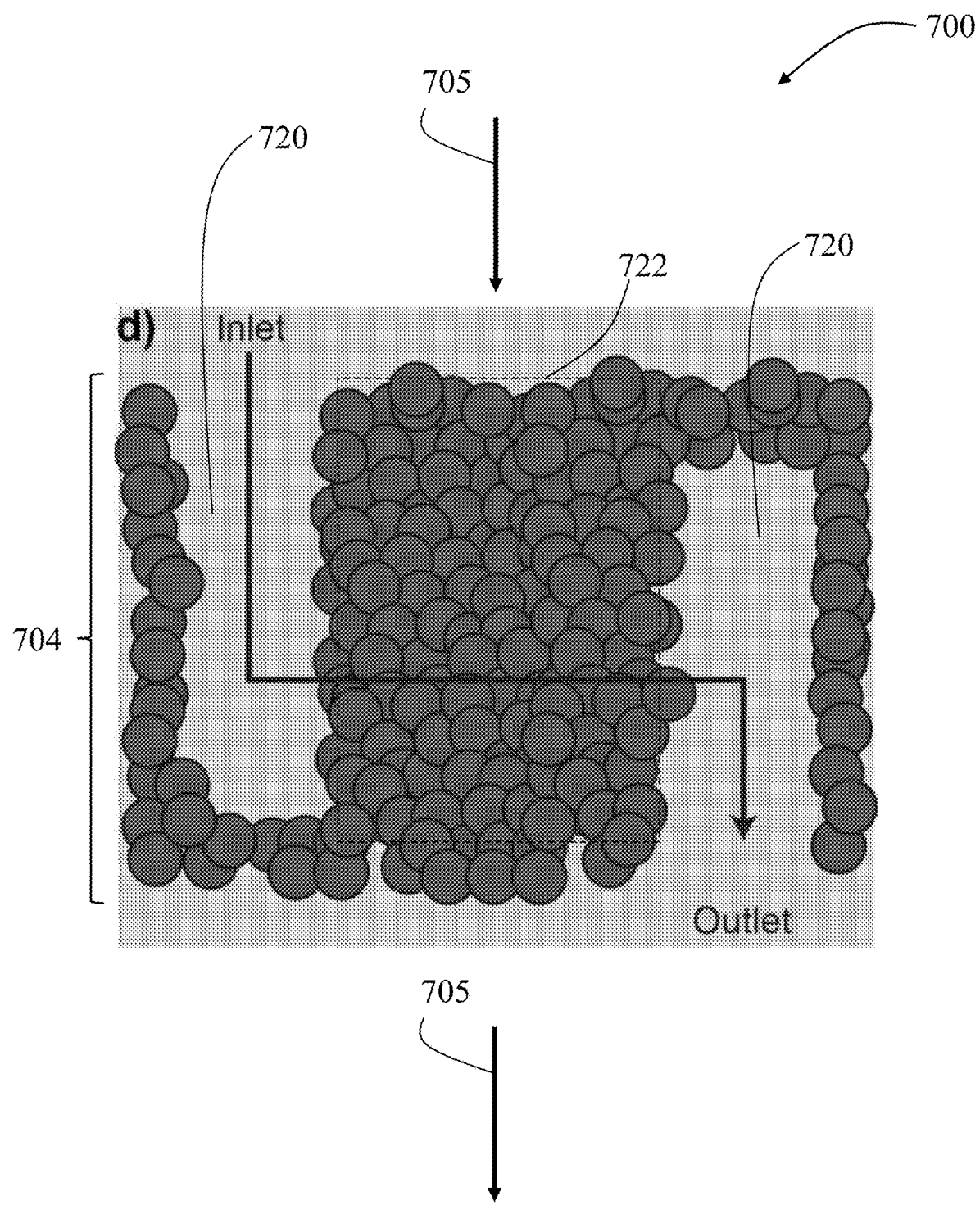

In some embodiments, the channel architecture is configured so as to maximize the surface area of the electrode to which the electrolyte is exposed, while maintaining a desirable pressure drop. The pressure drop may be varied by varying the distance across which the electrolyte has to pass through the porous portion of the electrode. For example, FIG. 1C shows a similar non-limiting embodiments as described in FIG. 1A, but the channels are arranged in a manner such that the distance which the electrolyte needs to flow through the porous portion of electrode 222 has increased (e.g., 214). Those of ordinary skill in the art will be capable of varying the architecture to vary the distance which the electrolyte needs to flow through the porous portion of electrode FIG. 3A provides another non-limiting example of an electrode configuration 400 having minimal free space and sufficient thickness 440 of electrode 404 resulting in a prohibitively high pressure drop across the electrode 404, poor capacity accessed, and poor penetration of ions from the electrolyte 406 into the electrode, even with electrolyte flow in direction 405. FIG. 3B also provides a non-limiting electrode configuration 500 having a channel 520 in electrode 504 for electrolyte flow in direction 505 and porous portions 522 through which the electrolyte 506 can also penetrate. The electrode configuration in FIG. 3B may have a minimal pressure drop to the detriment of capacity accessed for the electrode 504. Low capacity accessed may result at least in part from the electrolyte 506 flowing mainly through the channel 520 that runs through the entire thickness of the electrode 504, resulting in the primary mode of penetration of electrolyte into the porous portions 522 being diffusion. As a result, the electrolyte may not access all of the material surfaces in the porous portions 522 of the electrode. FIG. 3C shows yet another non-limiting electrode configuration 600 having a plurality of channels 620 in electrode 604 for flow of electrolyte 606 in direction 605 and a plurality of packed bed and/or porous portions 622, where the channels 620 and the packed bed and/or porous portions 622 are configured to form an interdigitated flow field of electrolyte 606. FIG. 3D is a schematic of a non-limiting electrode configuration 700 having a plurality of channels 720 in electrode 704 for electrolyte flow in direction 705 and a plurality of packed bed and/or porous portions 722, where the channels 720 and the packed bed and/or porous portions 722 are configured to form a flow-through field of electrolyte.

In some embodiments, the electrode is a thick electrode. In some embodiments, a thick electrode has a thickness of at least 300 microns. In some embodiments, the electrode has a thickness of at least 400 microns, at least 500 microns, at least 1 mm, at least 2 mm, at least 3 mm, at least 4 mm, or at least 5 mm. In some embodiments, the electrode has a thickness of at most 5 cm, at most 4 cm, at most 3 cm, at most 2 cm, at most 10 mm (1 cm), at most 9 mm, at most 8 mm, at most 7 mm, or at most 6 mm. Combinations of the above-referenced ranges are also possible (e.g., between or equal to 300 microns and 5 cm, between or equal to 300 microns and 10 mm, between or equal to 400 microns and 10 mm, between or equal to 500 microns and 10 mm, between or equal to 1 mm and 10 mm, or between or equal to 2 mm and 9 mm, between or equal to 3 mm and 8 mm, between or equal to 3 mm and 7 mm, between or equal to 1 cm and 5 cm). However, embodiments in which the thickness of the electrode is larger or smaller than those thicknesses noted above are also contemplated as the disclosure is not so limited.

In some embodiments, methods of fabricating an electrode comprising a composite mixture are provided. In some embodiments the method comprises providing a mixture comprising a pore-forming agent and a composite mixture comprising a charge storage material and a conductive material, and optionally a binder. In some embodiments, the composite mixture is formed by mixing the plurality of materials (e.g., a charge storage material, a conductive material, optionally a binder), following by addition of the pore-forming agent. In other embodiments, the mixture may be formed by combining the components and then mixing (e.g., combining the pore-forming agent, the charge storage material, the conductive material, and optionally the binder). Those of ordinary skill in the art will be aware of other methods for combining the components (e.g., combining the charge storage material and the conductive material, followed by addition of the binder, followed by addition of the pore-forming material; or combining the charge storage material and the conductive material, followed by addition of the pore-forming agent, followed by addition of the binder). The materials may be combined as solids and/or in liquids (e.g., as a slurry, or solubilized). In some embodiments, mixing may comprise mechanically mixing or mixing using a probe sonicator.

Non-limiting examples of pore-forming agents include materials that are soluble (e.g., salts such as sodium chloride, soluble polymers, etc.) and/or materials that may be thermally decomposed (e.g., a polymer that can be thermally removed) or combinations thereof. Non-limiting examples of pore-forming agents (also referred to as porogens) include naphthalene, sucrose, mannitol, poly(methyl methacrylate) (PMMA), dextrin, stearic acid, flour, polyvinyl butyral (PVB), wax spheres, calcium carbonate, carbon fibers, Poly [imino(1,6-dioxohexamethylene) iminohexamethylene] fibers, polyvinyl acetate, potato starch, wheat particles, wax spheres, almond crust, carbon beads, carbon fibers, carbon powder, frozen disodium hydrogen phosphate particles, water, methylcellulose, gelatin, paraffin oil, chitosan, cellulose, polyurethane, surfactants, hydrogen peroxide, sodium bicarbonate, ammonium bicarbonate, sodium chloride, thermoplastic polymers, epoxy resin, polyvinyl alcohol solution, or a suitable combination thereof. The pore-forming agent is generally a material that may remove upon application of an external stimuli or source (e.g., heat, radiation, exposure to a solvent, etc.). The pore-forming agent may be provided in any suitable amount, for example 0.1 wt % to 99 wt % versus the total weight of the mixture (e.g., between or equal to 1 wt % and 90 wt %, between or equal to 10 wt % and 80 wt %, or between or equal to 20 wt % and 40 wt % versus the total weight of the mixture (e.g., comprising the pore-forming agent and the composite mixture). The pore-forming agent may be selected to provide the desired pore size. For example, when using a salt, the salt may be selected to have an average particle size that corresponds with the desired size of the resulting pores in the electrode.

In some embodiments, the mixture or the composite mixture may be uniform. The term "uniform" herein may refer to varying in composition (e.g., in the weight ratio of any two components in the composite mixture) by no more than a factor of 0.5 throughout a mixture.

In some embodiments, the mixture may be formed in the presence of or using a liquid. For example, mixing may include adding a liquid (e.g., an aqueous or non-aqueous liquid) during mixing to facilitate uniform dispersion of the materials when forming the composite mixture. The liquid may include N-methyl-2-pyrrolidone (NMP), water, or a combination thereof, or another liquid. In some embodiments, the electrode fabrication method may include dissolving the binder in a solvent before mixing the binder with the other material(s).

In embodiments where a liquid is utilized, the method generally comprises removing the liquid (e.g., by evaporation, by sublimation, by applying vacuum, by sub- or supercritical drying) after mixing, thereby forming a solid (e.g., a powder).

Following formation of the mixture (e.g., comprising the composite mixture and the pore-forming agent), the mixture may be compacted, thereby forming a compacted mixture. In some embodiments, the compacting comprises filling a die with the composite mixture and mechanically compacting (e.g., with a hydraulic press) the mixture to form a pellet (e.g., a thick pellet having a thickness of greater than or equal to 300 microns). Those of ordinary skill in the art will be aware of other methods for compacting the mixture. In some embodiments, the mixture may be 3D printed to form a compacted mixture. In some embodiments, the mixture may be compacted into an pellet via applying one or more magnetic fields to the composite mixture or casting the composite powder in a removable mold. Non-limiting examples of a removable mold include but are not limited to ice, plastic, and/or other low-melting-temperature solids.

In some embodiments, electrode fabrication involves forming the composite mixture (e.g., composite powder) into a porous structure using additive manufacturing (e.g., three-dimensional printing). In such embodiments, 3-dimensional flow channels may be integrated into the porous structure. In some embodiments, additive manufacturing may be used to 3-D print an electrode using a 3-D printer, resulting in fine control of channels for electrolyte flow, e.g., to a resolution of between or equal to 1 micron and 10 microns. Embodiments in which resolution of printing is larger or smaller than those resolutions noted above are also contemplated as the disclosure is not so limited.

In some embodiments, electrode fabrication involves controlling the dimensions and/or porosity of the electrode by setting the amount of the composite mixture (e.g., composite powder) filled into a die and/or the pressure (e.g., hydraulic pressure) applied.

The one or more channels may be formed in an electrode during or following the compacting steps. For example, in some embodiments, the mixture may be compacted in a die that comprises features that form the one or more channels during the compacting step. In some embodiments, the channels may be formed following the compacting step. For example, the mixture may be compacted to form a compacted mixture (e.g., as a pellet), and one or more channels may be formed in the compacted mixture. Those of ordinary skill in the art will be aware of methods for forming channels in a compacted mixture (e.g., as a pellet). Non-limiting examples of methods for forming a channels in a pellet include mechanical methods (e.g., by drilling holes through the electrode) and/or by using a laser (e.g., by laser ablation) to remove material from the electrode.

During and/or following the compacting step, a plurality of pores may be formed. In some embodiments, the pores may be formed via removal and/or activation of the pore-forming agent. For example, in some embodiments, the pore-forming agent may be removed by dissolving the one or more pore-forming agents. In some embodiments, a solution in which the pore-forming agent is soluble is flown through the compacted mixture (e.g., prior to or following formation of the channels). Alternatively, the compacted mixture may be heated to remove the pore-forming agent (e.g., optionally under vacuum). The pore-forming agent may be removed to form the pores following the compacting step but prior to forming the one or more channels. In embodiments wherein the channels are formed during the compacting step, the pore-forming agent may be remove during or following the compacting step. Those of ordinary skill in the art will be able to contemplate other sequences of steps that result in the one or more channels being formed and the pore-forming agent being removed, thus forming pores. In some embodiments, the pores may form upon operation of a device comprising the electrode. For example, in embodiments wherein the pore-forming agent is soluble in the electrolyte contained in a device (e.g., convection battery), the pores may form upon operation of the device (e.g., the pore-forming agent may be dissolved as the electrolyte flows through the device).

In some embodiments, a thick electrode comprising a porous portion and plurality of channels may be formed by associating a plurality of thin electrodes. For example, a thick electrode having a thickness of x (e.g., wherein x is 300 microns to 5 cm) may be formed by stacking a total of "n" plurality of thin electrodes (e.g., wherein n is 5, 10, 20, or more) having x/n width. In some embodiments, each thinner electrode may comprises at least one channel, and the channel location for each thin electrode may be such that it does not align with the thin electrodes directly adjacent to that electrode. As a specific example, thinner electrodes may be stacked together and aligned such that complex channel structures are formed in the resulting thick electrode (e.g., electrode 804 in FIG. 4). The thinner electrode portions may be associated using methods known to those of ordinary skill in the art. In some embodiments, thinner electrodes are joined together through compaction by a hydraulic press, using a binder or other material to adhere the thinner electrodes together. In other embodiments, the thinner electrodes may be associated during the during fabrication of a device (e.g., convection battery cell) comprising the thick electrode. In some embodiments, two channels per each of 2 thinner electrodes are combined to form four channels by first rotating one thinner electrode with respect to the other, e.g., by between or equal to 30° and 90° (e.g., in process 800 and FIG. 4). In some embodiments, the thick electrode comprises between or equal to one channel and 100 channels, or more channels, depending on the transport properties required by the application of the electrode. In some embodiments, each thinner electrode (e.g., pellet) comprises between or equal to one channel in 100 channels, and a plurality of thinner electrode are combined together (e.g., by rotation, hydraulic pressing, using a binder, and/or layering) to mitigate the overall pressure drop through the stacked electrode.

Those of ordinary skill in the art will be able to contemplate other steps that may be carried out during the formation of an electrode. For example, the composite mixture or the mixture (e.g., comprising the composite mixture and the pore-forming agent), may be annealed (e.g., for crystallization or microscale processing) prior to or following formation of the compacted mixture. Other steps are also contemplated, for example, milling the mixture (e.g., composite mixture or mixture comprising the composite mixture and the pore-forming agent) to reduce particle size prior to the compacting step.

It should be understood that electrode fabrication as described herein can be applied to a wide variety of device chemistries (e.g., convection battery cell chemistries), including both aqueous and non-aqueous chemistries, e.g., chemistries for lithium-ion batteries.

In some embodiments, the electrodes described herein or formed via a method described herein may be utilized in devices, for example, convection batteries.

In some embodiments, a device comprising an electrode described herein or formed via a method described herein may access at least 40%, at least 50%, at least 60%, at least 70%, at least 80%, or at least 90% of the theoretical capacity of the electrode.

In some embodiments, devices comprising an electrode described herein or formed via a method described herein may access at least 50% of the theoretical capacity of the electrode for at least 100 cycles, at least 200 cycles, at least 300 cycles, at least 400 cycles, at least 500 cycles, or at least 1000 cycles. In some embodiments, devices comprising an electrode described herein or formed via a method described herein may access at least 50% of the theoretical capacity of the electrode for at most 10,000 cycles, at most 8000 cycles, at most 6000 cycles, at most 4000 cycles, at most 3000 cycles, or at most 2000 cycles. Combinations of the above-referenced ranges are also possible (e.g., between or equal to 100 cycles and 10,000 cycles, between or equal to 1000 cycles and 10,000 cycles). In certain embodiments, devices comprising an electrode described herein may access at least 50% of the capacity of the electrode for between or equal to 1000 cycles and 10,000 cycles.

In some embodiments, devices comprising an electrode described herein or formed via a method described herein may access at least 50% of the theoretical capacity of the electrode with no capacity accessed fade over the course of at least 1 month, at least 2 months, at least 3 months, at least 4 months, or at least 5 months with continuous use. In some embodiments, devices comprising an electrode described herein may access at least 50% of the theoretical capacity of the electrode with no capacity accessed fade over the course of at most 5 years, at most 4 years, at most 3 years, at most 2 years, at most 1 year, at most 10 months, at most 8 months, or at most 6 months with continuous use. Combinations of the above-referenced ranges are also possible (e.g., between or equal to 1 month and 5 years, between or equal to 5 months and 5 years). In certain embodiments, devices comprising an electrode described herein may access at least 50% of the capacity of the electrode with no capacity accessed fade over the course of between or equal to 5 months and 5 years.

In some embodiments, devices comprising an electrode described herein may access at least 50% of the theoretical capacity of the electrode for at least 1000 cycles with no capacity accessed fade over the course of at least 5 months.

In some embodiments, a convection battery comprising a convection battery cell that comprises an electrode as described herein or formed via a method described herein is provided. In some embodiments, the convection battery cell may comprise a plurality of components which will be known to those of ordinary skill in the art. Non-limiting examples of components include electrodes (e.g., as described herein or formed via a method described herein), current collectors, electrolyte, separators, diffuser plates, gaskets, inlets and outlets, valves, and heat exchangers.

Figure 2:
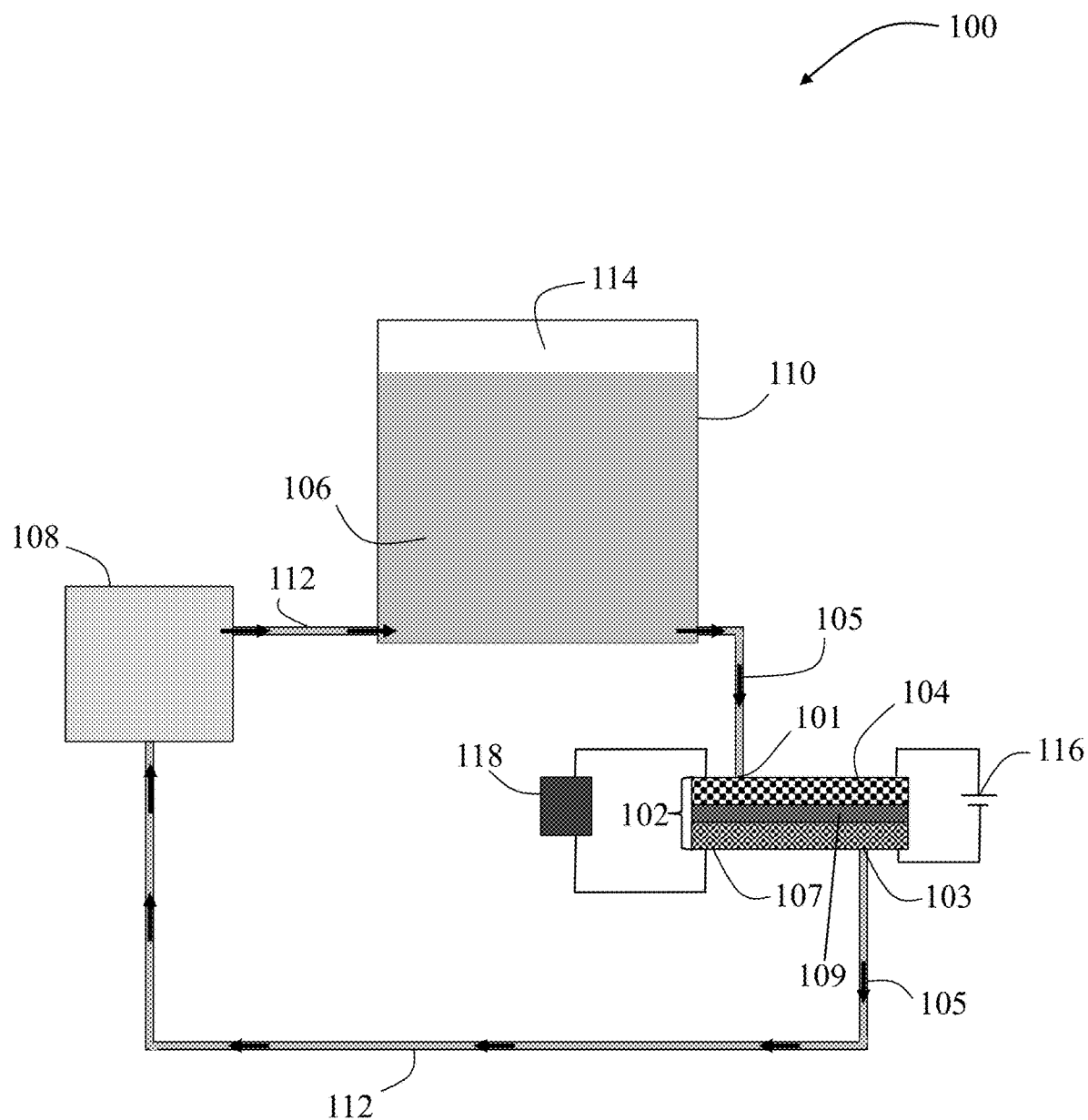
FIG. 2 shows a schematic of a non-limiting convection battery, according to certain non-limiting embodiments.

FIG. 2 is a schematic of a non-limiting convection battery 100, according to certain embodiments. Convection battery apparatus 100 may comprise a convection battery cell 102 described herein that comprises an electrode 104 (e.g., as described herein or formed via a method described herein) proximate to an inlet 101 and a second electrode 107 proximate to an outlet 103 separated by a separator 109. The convection battery cell 102 may comprise inlet 101 and outlet 103. The inlet 101 and outlet 103 may be configured for an electrolyte 106 to flow through the cell along an electrolyte flow direction 105 into the inlet 101 and out of the outlet 103. The convection battery apparatus 100 may also comprise a pump 108 configured in series with the convection battery cell 102 by tubing 112 to force electrolyte 106 through the convection battery cell 102 in electrolyte flow direction 105. The convection battery apparatus 100 may include an electrolyte reservoir 110 configured in series with the convection battery cell 102 and the pump 108 by tubing 112, to provide electrolyte 106 to the convection battery cell 102 through tubing 112. In some embodiments, the electrolyte reservoir 110 includes a valve (not shown) through which gas 114 created from side reactions involving the electrolyte may be released and/or replaced with an inert gas. The convection battery apparatus 100 may include power source 116 configured to apply an electrical potential to the convection battery cell 102, e.g., during a cleaning process to help dissolve unwanted products or to regenerate electrode materials. In some embodiments, the convection battery cell 102 supplies load 118 with power during operation.

The convection battery cell may comprise one or more inlets and one or more outlets. The one or more inlets and one or more outlets may be configured for an electrolyte to flow through the cell along an electrolyte flow direction into the one or more inlets and out of the one or more outlets. In some embodiments, the convection battery comprises a pump. In some embodiments, the electrolyte is forced through the cell with a pump. In some embodiments, the electrolyte is forced through the cell through a static pressure gradient, using gravity-induced flow. In some embodiments, the convection battery may comprise an electrolyte reservoir configured to provide electrolyte to the convection battery cell, e.g., through tubing fluidly connected in series with the convection battery cell. In some embodiments, the convection battery cell of the present disclosure comprises free-standing components (e.g., electrodes). In some embodiments, one or more electrodes provided herein are free-standing.

In some embodiments, the convection battery cell has an inlet valve and an outlet valve that may both be kept open during operation of the convection battery, in a configuration for flow of the electrolyte through the convection battery cell and to facilitate electrolyte monitoring for convection battery maintenance purposes.

In some embodiments, the electrolyte of the convection battery comprises additives, e.g., to enhance performance, or scrubbers (e.g., bubbling gas), to remove unwanted components (e.g., water, hydrofluoric acid).

In some embodiments, the convection battery may comprise a heat exchanger, configured to remove heat from the electrolyte that was generated from battery operation. In some embodiments, the heat exchanger is built into the electrolyte reservoir as a single unit. In some embodiments, the heat exchanger is configured in series with the pump and the electrolyte reservoir. In some embodiments, the heat exchanger is configured to utilize power from the convection battery cell.

In some embodiments, the convection battery may comprise a valve connecting the convection battery cell with the electrolyte reservoir, a valve connecting the pump with the electrolyte reservoir, or a valve connecting the convection battery cell with the pump, or any combination of said valves, or a plurality of valves connecting any combination thereof. In some embodiments, one or more valves may be used to isolate the convection battery cell from the electrolyte reservoir and/or the pump. This isolation may facilitate the convection battery cell to be transported or maintained independently of the overall convection battery.

In some embodiments, the convection battery cell may comprise a separator (e.g., a polyporous plastic separator). The separator may electronically separate an electrode in a convection battery cell from at least a second electrode. In some embodiments, an electrode in a convection battery cell may be electronically separated from at least a second electrode, e.g., by a physical gap or a separator (e.g., comprising an electrically insulating material). In other embodiments, the convection battery cell may be absent any separator. One or more active materials in the convection battery cell may include insoluble particles, and therefore there may be no requirement for a membrane (e.g., a species-selective membrane) or other selective separator for convection battery cell operation (e.g., to control species transport between two or more electrodes in the convection battery cell). In embodiments absent any separator in the convection battery cell, this may reduce the cost of the convection battery cell and may reduce the complexity of manufacturing the convection battery cell. In addition, as convection may enhance ion transport, the convection battery cell may comprise a thick separator (e.g., a separator of at least 300 nm in thickness) configured to support convection in the electrolyte, with a greater separator thickness than in other batteries. In some embodiments, the separator may be at least one micrometer in thickness. In some embodiments, a thick separator may be included in the convection battery cell to reduce cost, improve safety, and/or simplify manufacturing of the convection battery cell.

In some embodiments, the convection battery cell may include a plurality of electrodes (e.g., in a stack) inside the convection battery cell, e.g., to modify the overall voltage of the convection battery cell. In some embodiments, at least one of these electrodes may be an electrode fabricated using methods described herein. In some embodiments, the electrodes may have different redox potentials from one another, and/or may be electrically connected together. In order to increase the voltage of the convection battery cell, while using the same casing and current collector, electrodes with different redox potentials that are electrically connected together may be inserted into or removed from the device to increase or decrease the overall energy or power of the convection battery cell. A convection battery cell including a plurality of electrodes may have greater power and/or energy associated with the cell than a similar convection battery cell having a single electrode or fewer electrodes of similar size. In embodiments in which the electrodes are free-standing and/or can be readily handled, the number of electrodes included in the convection battery cell may be changed depending on the application.

In some embodiments, the convection battery may include a plurality of convection battery cells described herein fluidly connected in series and/or in parallel (e.g., to form a convection battery cell stack) sharing the same electrolyte. Electrolyte cost may pose a hindrance to widespread implementation of batteries. By sharing electrolyte among several convection battery cells, the overall cost of the electrolyte may be significantly reduced relative to electrolyte used in a single battery cell. In addition, such a convection battery cell stack may be run using only a single pump, which also presents energy savings possibilities.

In some embodiments, the convection battery cell may have favorable performance metrics relative to comparable convection battery cells having electrodes of a different architecture from those in embodiments of the present disclosure. The convection battery cell may have a capacity accessed of at least 50%, a voltaic efficiency of at least 70%, and/or a Coulombic efficiency of at least 95%.

In some embodiments, methods of operating and/or maintaining a convection battery and/or a convection battery cell in the convection battery are provided. In some embodiments, the method of operation may comprise supplying a load with power from the convection battery cell. In some embodiments, the method of operation and/or maintenance may comprise monitoring an electrolyte during operation of the convection battery, e.g., in the tubing, or in the electrolyte reservoir. The method of operation and/or maintenance may comprise adding (e.g., injecting) additives or scrubbers to the electrolyte, e.g., through a hole or septum or other inlet in the electrolyte reservoir, in the tubing, or in the convection battery cell. The additives or scrubbers may be added to the electrolyte to enhance performance or remove unwanted components respectively. In some embodiments, the method of operation and/or maintenance may comprise releasing gas created from side reactions involving the electrolyte and/or replacing said gas with an inert gas (e.g., nitrogen, $N_2$; argon, Ar). In some embodiments, the method of operation and/or maintenance may comprise electrolyte replenishment one or more times (e.g., continual electrolyte replenishment), in order to minimize consumption of the electrolyte via decomposition or evaporation or by another means, which may otherwise be a hazardous failure mode sometimes found in traditional batteries. In some embodiments, the method of operation and/or maintenance may comprise completely draining the battery (e.g., to prevent catastrophic failure of the convection battery during operation). In some embodiments, the battery may be transported dry with no electrolyte present, thereby significantly reducing safety hazards of the battery, and then the battery may be filled with electrolyte at the destination point of use.

In some embodiments, the method of operation and/or maintenance may comprise flowing electrolyte through the convection battery cell at a flow rate of between or equal to 0.3 mL/h and 1 mL/h. However, embodiments in which flow rate of the electrolyte in a device comprising the electrode are larger or smaller than those flow rates noted above are also contemplated as the disclosure is not so limited.

In some embodiments, the method of operation and/or maintenance includes applying vacuum at either or both of the one or more inlets and the one or more outlets of a convection battery cell to remove contaminants from the convection battery cell. In addition, the method of operation and/or maintenance may be followed by pumping inert gas through the convection battery cell to return the cell to atmospheric pressure, followed by flowing electrolyte through the cell to displace the inert gas.

In some embodiments, the method of operation and/or maintenance may comprise a cleaning process comprising draining electrolyte from the convection battery cell into the electrolyte reservoir, and then passing a cleaning solution through the convection battery cell, followed by refilling the convection battery cell with the electrolyte. During this cleaning process, a power source may apply an electrical potential to the convection battery cell, e.g., to help dissolve unwanted products or to regenerate electrode materials. In some cases, the cleaning process may involve dissolving solid-electrolyte interphases (e.g., oxide films, chloride compounds) present in aqueous batteries (e.g., lead (Pb)-acid, Prussian blue) by passing acid or a strong base through the convection battery cell after first draining the electrolyte from the convection battery cell. In some embodiments, the cleaning process may involve dissolving solid-electrolyte interphases present in non-aqueous batteries (e.g., metal ion) by passing acetonitrile or another suitable organic solvent through the convection battery cell after first draining the electrolyte from the convection battery cell. In some embodiments, the cleaning process may involve removing dendrites (e.g., metal dendrites) by passing a solution through the battery to dissolve said dendrites. In some embodiments, the cleaning process may involve using a power source to apply a specific potential near the redox potential of a molecule to remove said molecule while passing cleaning solution through the convection battery cell. In some embodiments, the cleaning process may significantly extend the lifetime of the convection battery cell.

In some embodiments, the method of operation and/or maintenance may include a heating process or a cooling process to heat or cool the electrolyte respectively. In some embodiments, the heating process may comprise heating the electrolyte during operation of the convection battery. In some embodiments, the cooling process may comprise passing the electrolyte through a heat exchanger to remove heat generated from battery operation. Batteries may generate heat during operation due to natural thermodynamic inefficiencies. Non-aqueous batteries (e.g., lithium-ion batteries) may utilize a flammable electrolyte which may cause the battery to undergo thermal runaway upon reaching a critical temperature of said flammable electrolyte. The electrolyte of the convection battery may be passed through a heat exchanger to cool the electrolyte during operation, which may not otherwise be possible if the convection battery cell did not have an inlet or an outlet. In some embodiments, e.g., during operation in a cold-weather climate, the heating process may involve heating the electrolyte to minimize or prevent freezing of the electrolyte and/or to prevent potentially hazardous rupture of the battery resulting from freezing of the electrolyte.

In some embodiments, the method of operation and/or maintenance may include a vacuum process involving sealing off the convection battery cell from the electrolyte reservoir and placing the convection battery cell under vacuum to remove unwanted contaminants (e.g., water, oxygen) e.g., after other maintenance steps (e.g., after a cleaning process). Contaminants (e.g., water, oxygen) may be a major hindrance to high-performance non-aqueous batteries, as contaminants may lead to unwanted side reactions including the formation of hydrofluoric acid (HF). By placing the convection battery cell under vacuum, the individual components of the convection battery cell (e.g., electrode, current collectors, separator) can be dried and allowed to out gas, thereby substantially or entirely removing said contaminants. The method of operation and/or maintenance may include the vacuum process involving placing the convection battery cell under vacuum to remove contaminants, followed by refilling the convection battery cell with electrolyte. In embodiments where the convection battery is aqueous, the method of operation and/or maintenance may include evaporating an organic cleaning agent from the battery components after flushing the components with said organic cleaning agent.

In some embodiments, the method of operation and/or maintenance may include a disassembly process involving disassembling the convection battery cell, combined with a replacement process involving replacement of the electrode and/or other components of the convection battery cell including but not limited to diffuser plates, gaskets, and current collectors. In some embodiments, disassembly may be facilitated in convection battery cells having one or more free-standing electrodes that are not chemically attached, deposited, or laminated to a current collector, but rather that are held together e.g. by mechanical pressure. In such embodiments, the physical integrity of the one or more free-standing electrodes and other components of the convection battery cell is not compromised upon disassembly. Degradation of one or more active components in a battery (e.g., the electrode, the electrolyte), both through natural means and through side reactions, may fundamentally limit the lifetime of the battery. In instances where a battery is hermetically sealed, the battery may require shipping back to a manufacturing facility or a designated center for maintenance or disposal as a result of this degradation. In embodiments of the present disclosure, a convection battery facilitates disassembly and replacement of individual components at the site of operation. As an example, if an electrode wears out, the electrode may be replaced while maintaining the same electrolyte, current collectors, and other components of the battery. Therefore, in non-limiting embodiments described herein, the lifetime of a convection battery may be determined at least in part by the frequency of maintenance (e.g., by a technician).

In a non-limiting method of operation and/or maintenance of a convection battery comprising an electrode described herein, the method includes draining the convection battery cell by pumping air through the convection battery to push the electrolyte out from the convection battery cell towards the electrolyte reservoir. In this non-limiting method, a pump then cleans the convection battery by pumping one or more cleaning solutions through the convection battery. The non-limiting method then involves purging the convection battery of contaminants by placing the convection battery cell under vacuum or by flowing inert gas through the convection battery. A pump then reintroduces the electrolyte into the convection battery cell by pumping the electrolyte through the convection battery cell to resume operation. During this non-limiting method, the at least one inlet and the at least one outlet to the convection battery cell may not be disconnected and a respective plug may not be placed at the at least one outlet. Draining electrolyte, cleaning the battery, and reintroducing electrolyte may occur at the electrolyte reservoir, rather than at the convection battery cell.

Convection batteries in some embodiments of the instant disclosure also may have a simplified manufacturing method of the convection battery as compared with hermetically sealed batteries lacking an inlet or an outlet, as the one or more electrodes and the overall convection battery cell may be manufactured in ambient conditions and then assembled at the site of operation. In some embodiments, during manufacturing of the convection battery cell, methods of operation and/or maintenance as described herein may be used, e.g., to remove impurities and/or to fill the convection battery cell with electrolyte. In some embodiments, manufacturing may include mechanical sealing of a convection battery cell to configure the convection battery cell to allow for variation in electrode thickness on the order of hundreds of micrometers, contributing to cheaper, low precision manufacturing compared with similar battery cells.

In some embodiments, the battery may be chemically charged and then electrochemically discharged, in order to directly have power upon setting up the device, as opposed to requiring electrochemical charging of the battery first before discharge. In some such embodiments, the battery may be transported dry with no electrolyte, and then at a location of use the battery may be filled with a solution to chemically charge the battery. In some embodiments, the battery may then be drained of this charging solution and filled with normal electrolyte. In some embodiments, a method proceeds with electrochemically discharging the battery.

EXAMPLES

Figure 4:
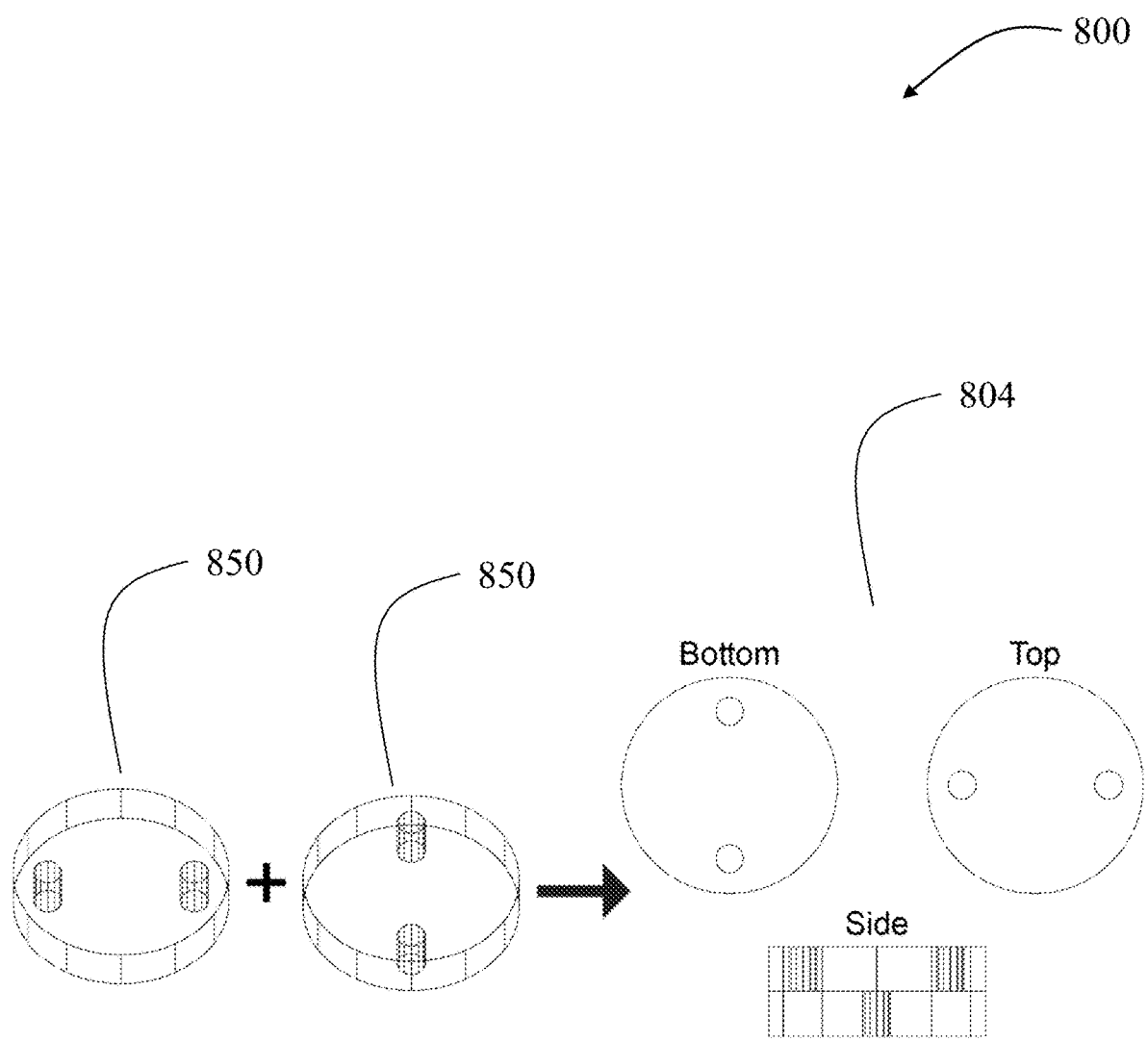
FIG. 4 shows a schematic diagram for a process to build up a thick electrode with a complex flow design, according to certain non-limiting embodiments.

Example 1: Non-Limiting Method for Fabricating Complex Flow Designs in Thick Electrodes FIG. 4 shows a schematic diagram for a process 800 to form a thick electrode comprising a porous portion and a plurality of channels by associating a plurality of thinner electrodes, according to certain non-limiting embodiments.

In some embodiments, a plurality of thinner electrodes (e.g., pellets) with a thickness of approximately 1 mm were prepared comprising 2 channels each formed in each thinner electrode 850 using methods disclosed herein. In some embodiments, two thinner electrodes (e.g., pellets) were then stacked together such that channel locations for a first thinner electrode did not align with the channel locations for the second electrode directly adjacent to the first thinner electrode, e.g., in resulting electrode 804. In some embodiments, the thinner electrodes were joined together through compaction by a hydraulic press, using a binder to glue the thinner electrodes together, or by associating the thinner electrodes together (e.g., in process 800) during fabrication of a device comprising the electrode. In FIG. 4, two individual channels per pellet were combined to form four channels. In some embodiments, the electrode comprises between or equal to one channel and 100 channels, or more channels, depending on the transport properties required by the application of the electrode. In some embodiments, each pellet comprises between or equal to one channel in 100 channels, and the pellets are combined together to mitigate the overall pressure drop through the stacked electrode.

Example 2: SEM Images of Electrodes

Figure 5:
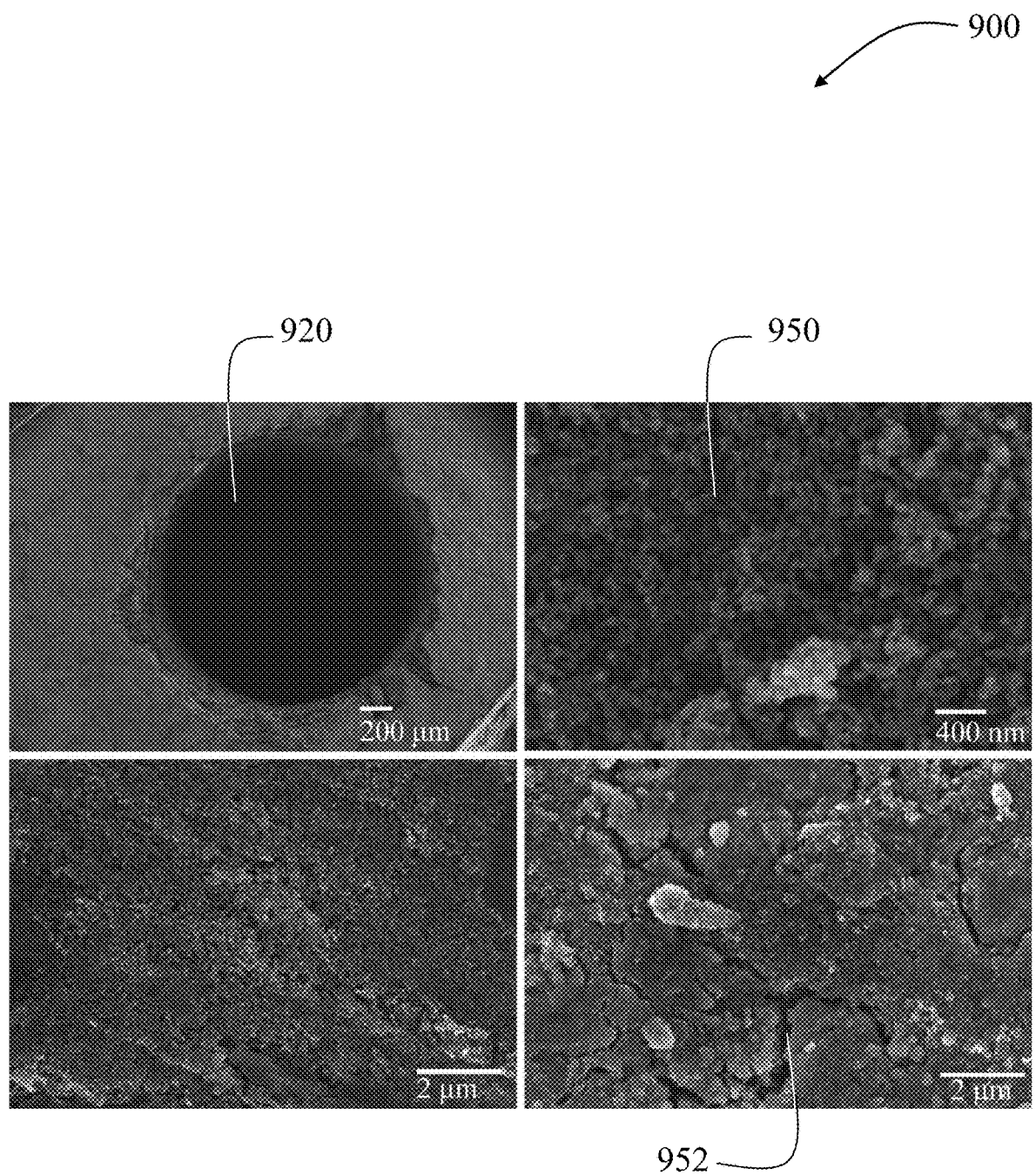
FIG. 5 shows scanning electron microscopy (SEM) images of thick electrodes, according to certain non-limiting embodiments.

FIG. 5 shows scanning electron microscopy (SEM) images 900 of thick electrodes, according to certain non-limiting embodiments. FIG. 5 shows a microstructure for electrodes formulated for use in aqueous devices (e.g., aqueous convection battery cells). In the upper left corner, a channel 920 for flow through an electrode pellet is shown. In the other images, a distribution of pores in an electrode pellet is shown: ranging from pores on the 10 nm scale (e.g., pore 950), 100 nm scale (e.g., pore 952), and 1 micron scale.

Example 3: Performance Increase by Introducing Channels

Figure 6A:
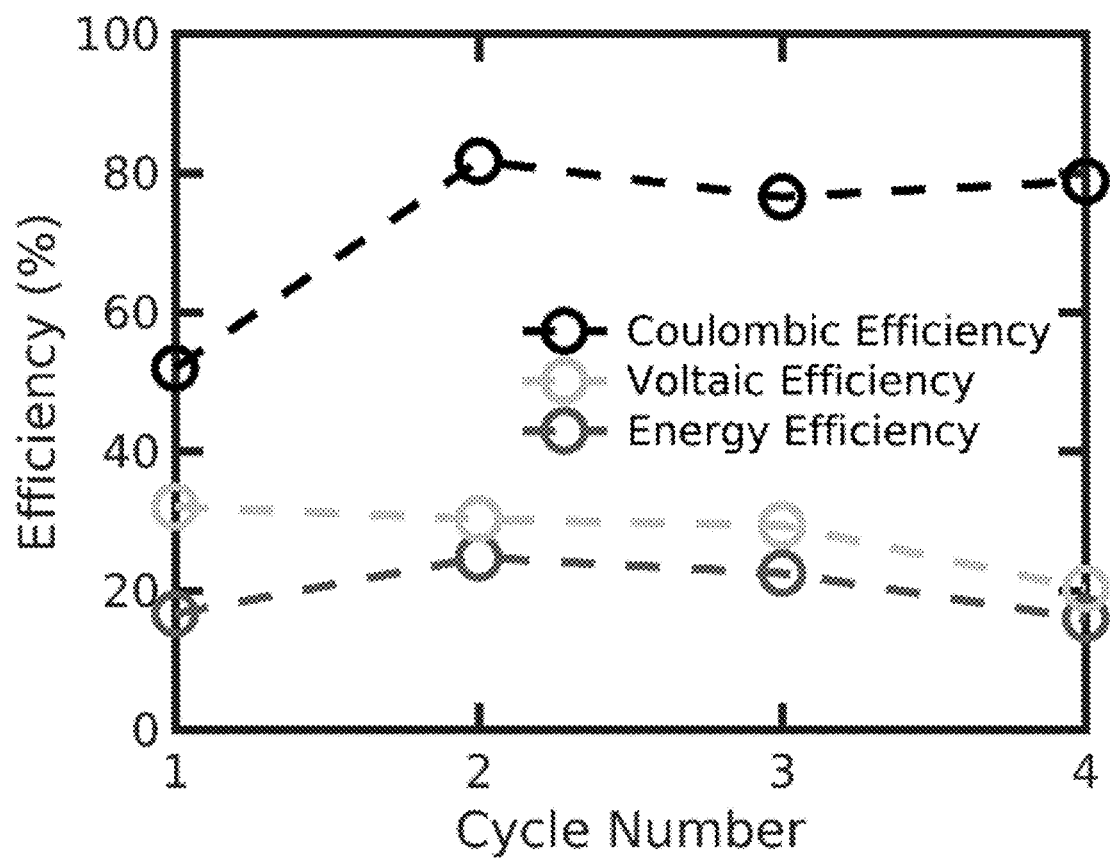
FIG. 6A shows a plot of Coulombic efficiency, voltaic efficiency, and energy efficiency of a convection battery cell comprising a thick electrode having no channels, according to certain alternative configurations, e.g., to those in FIG. 7A.
Figure 6B:
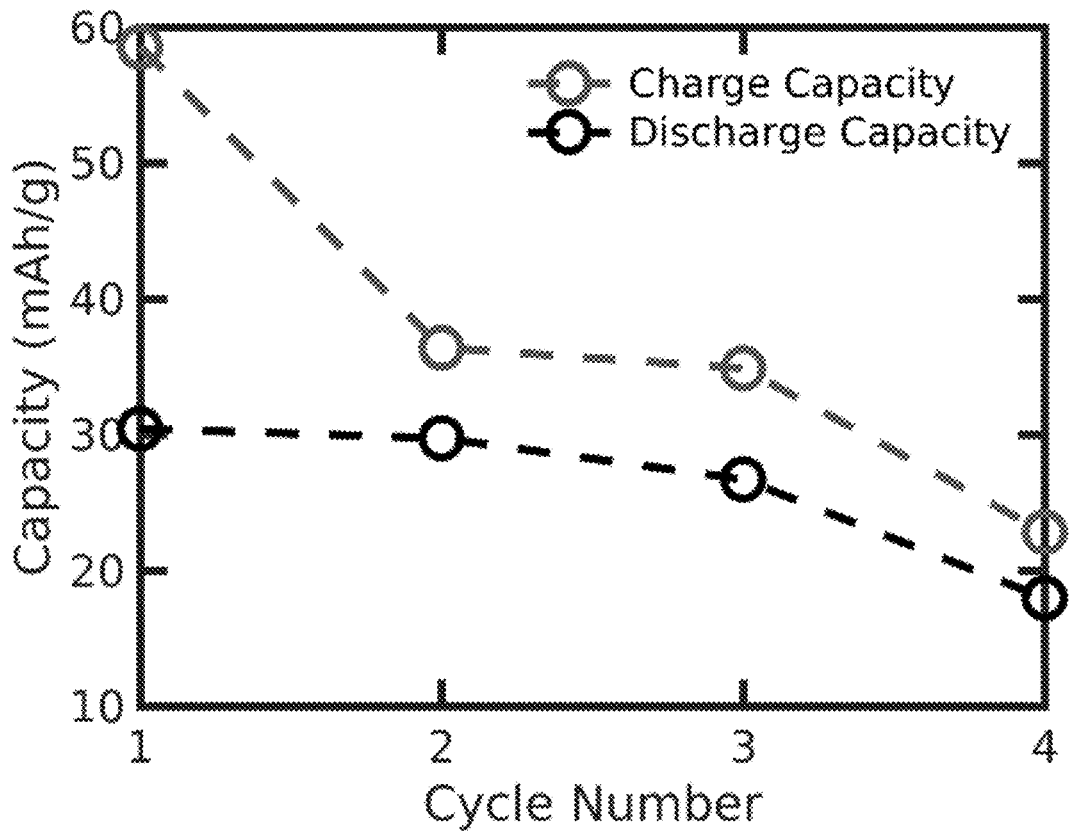
FIG. 6B shows a plot of charge capacity and discharge capacity of a convection battery cell comprising a thick electrode having no channels, according to certain alternative configurations, e.g., to those in FIG. 7B.
Figure 7A:
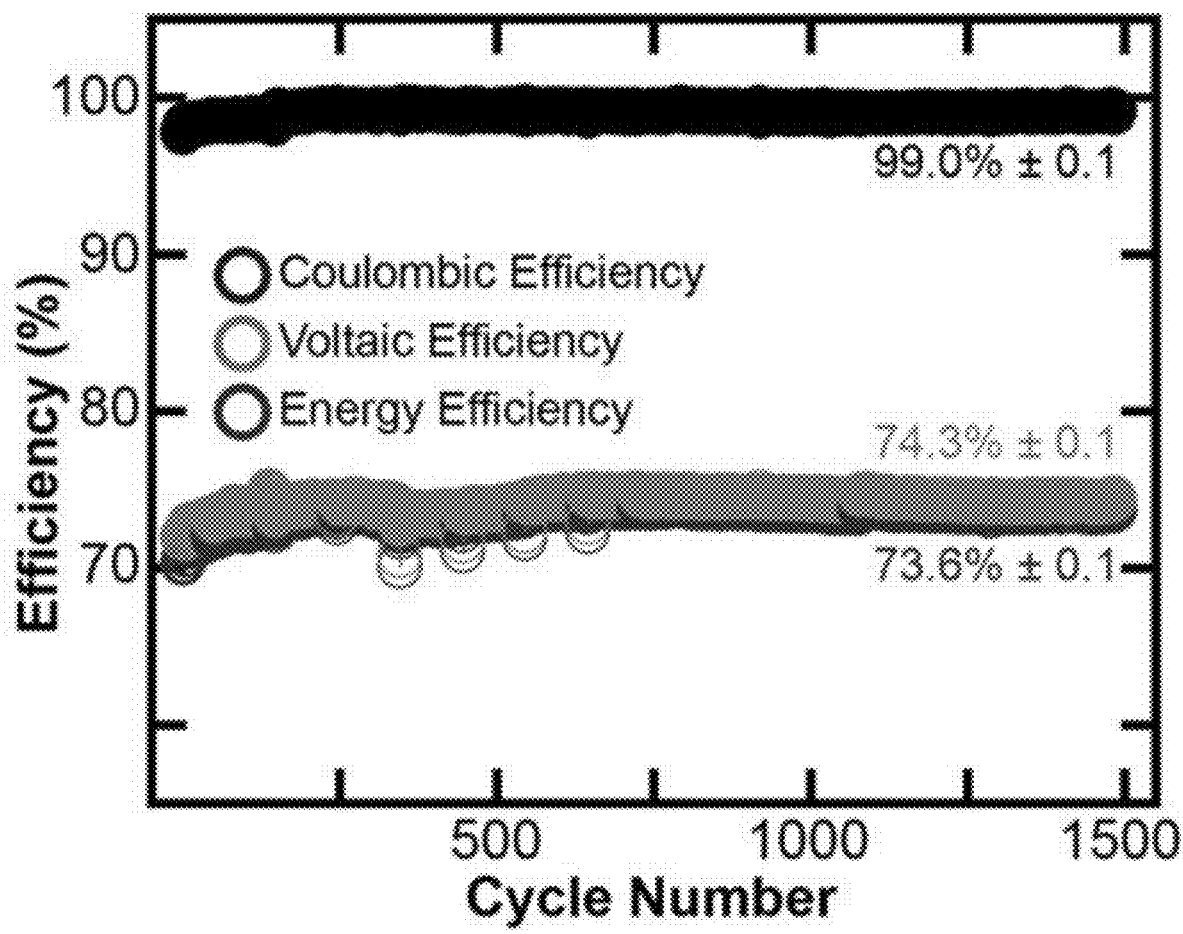
FIG. 7A shows a plot of Coulombic efficiency, voltaic efficiency, and energy efficiency of a convection battery cell comprising a thick electrode having channels, according to certain non-limiting embodiments.

FIG. 6A shows a plot of Coulombic efficiency, voltaic efficiency, and energy efficiency of a convection battery cell comprising a thick electrode having no channels, according to certain alternative configurations, e.g., to those in FIG. 7A. FIG. 6B shows a plot of charge capacity and discharge capacity of a convection battery cell comprising a thick electrode having no channels, according to certain alternative configurations, e.g., to those in FIG. 7B. FIGS. 6A and 6B show plots for an electrode 3 mm in thickness, having no channels and formulated for use in aqueous devices. The convection battery cell characterized in FIGS. 6A and 6B could not be cycled at a rate greater than C/12, and poor capacity accessed (declining at an average rate of between or equal to approximately 50% in 4 cycles and approximately 67% and 4 cycles) and efficiency (energy efficiency of between or equal to approximately 15% and approximately 25%, voltaic efficiency of between or equal to approximately 20% and approximately 35%, Coulombic efficiency of between or equal to approximately 50% and approximately 82%) was observed.

Figure 7B:
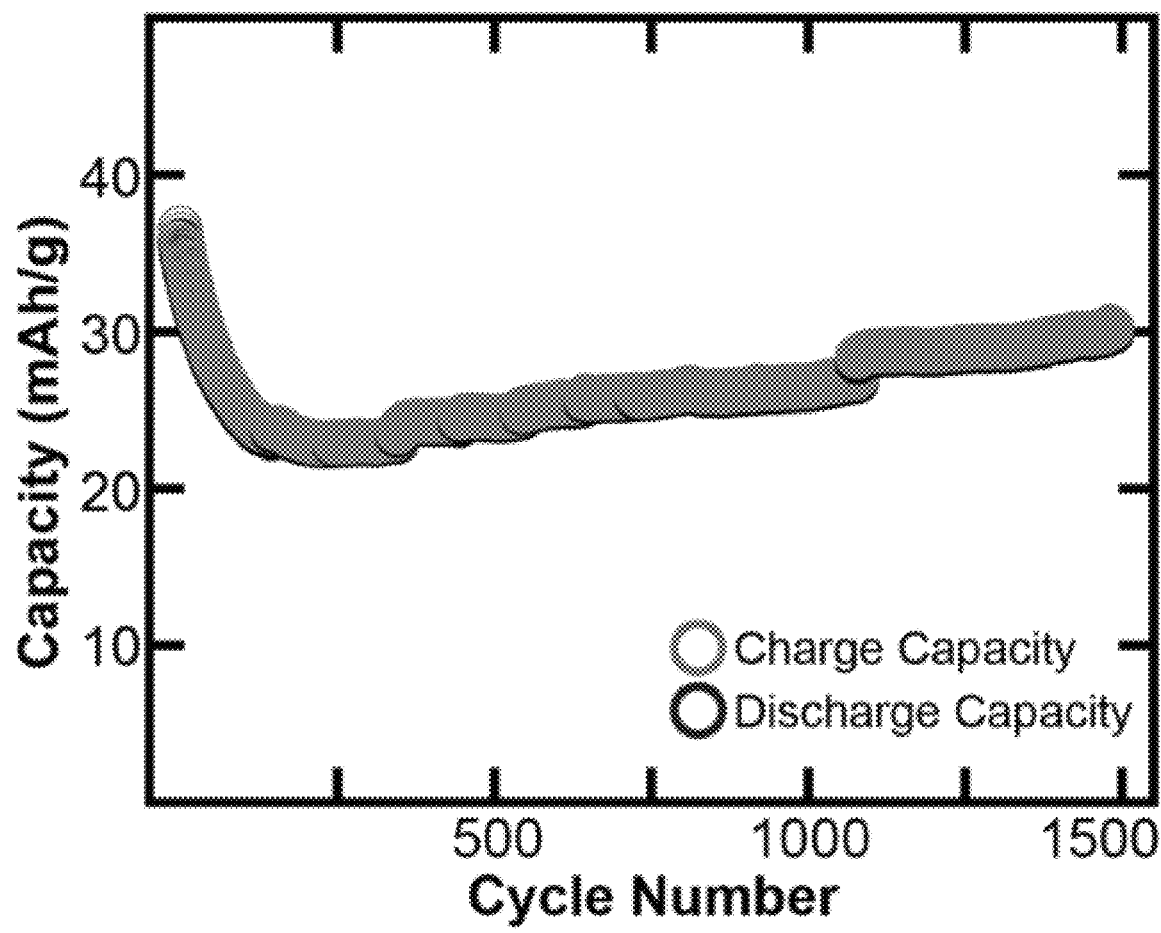
FIG. 7B shows a plot of charge capacity and discharge capacity of a convection battery cell comprising a thick electrode having channels, according to certain non-limiting embodiments.

By contrast, FIG. 7A shows a plot of Coulombic efficiency, voltaic efficiency, and energy efficiency of a convection battery cell comprising a thick electrode having channels, according to certain non-limiting embodiments; and FIG. 7B shows a plot of charge capacity and discharge capacity of a convection battery cell comprising a thick electrode having channels, according to certain non-limiting embodiments. By introducing designated channels for flow of electrolyte through the electrode in a convection battery cell comprising the electrode, the convection battery cell characterized in FIGS. 7A and 7B attained much greater Coulombic, voltaic, and energy efficiencies (between or equal to approximately 95% and approximately 100%, between or equal to approximately 70% and approximately 76%, and between or equal to approximately 70% and approximately 76% respectively) and accessed a greater stable capacity accessed (60%). The convection battery cell characterized in FIGS. 7A and 7B was discharged at a rate of C/2.5 corresponding to over ten months of stable cycling. For this convection battery cell comprising an electrode described herein, the theoretical capacity accessed was 50 mAh/g. The convection battery cell characterized in FIGS. 7A and 7B included an electrode having six channels spanning the entire thickness of the 3 mm-thick electrode, each channel with a diameter of approximately 0.159 cm. The performance of the convection battery cell characterized in FIGS. 7A and 7B had a much higher capacity access (60% for over 10 months of stable cycling) than that obtained by alternative configurations (e.g., 24% for 10 cycles).

Figure 8A:
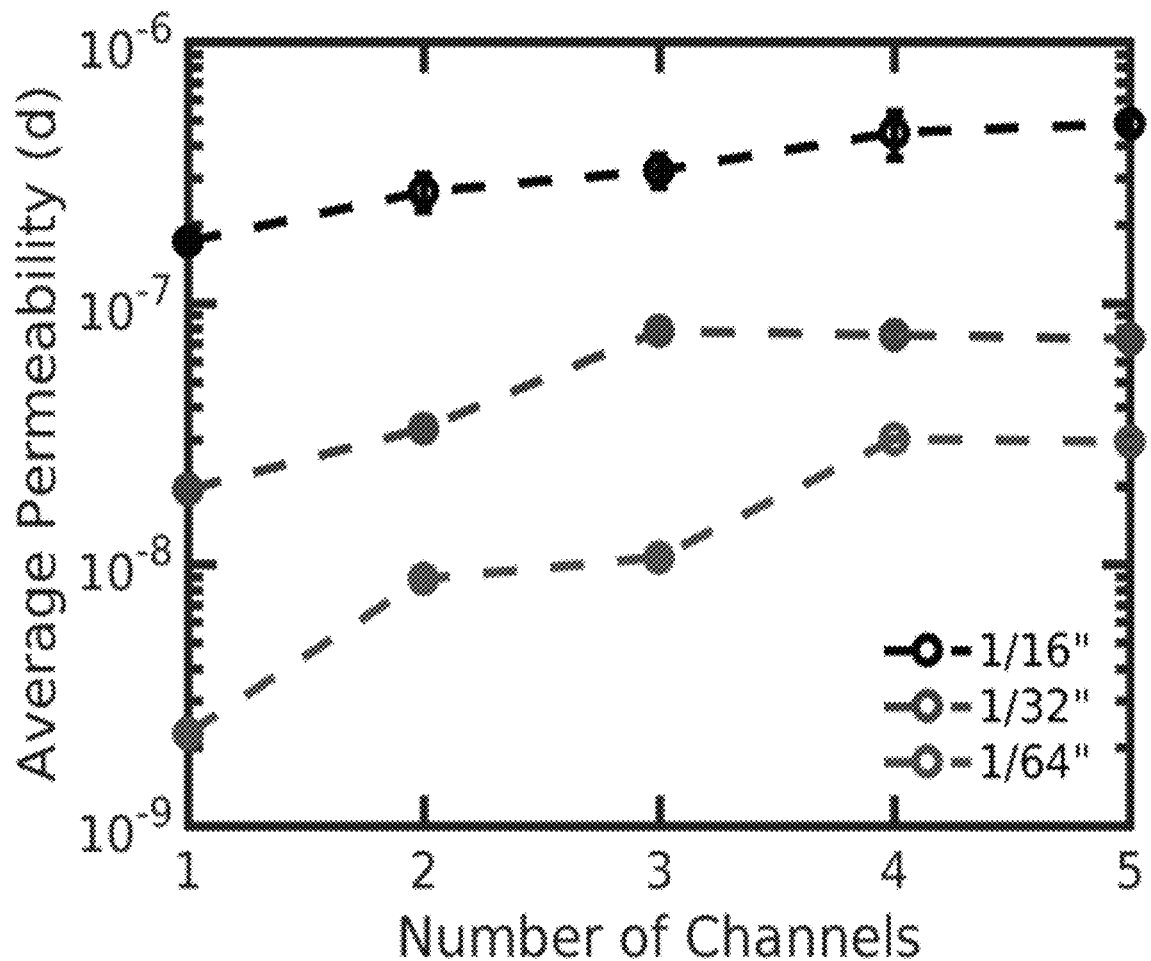
FIG. 8A shows a plot of the average permeability and the number of channels of varying diameter (e.g. $\frac{1}{64}$", $\frac{1}{32}$", and 1/16") of a cell assembled using a single electrode for each data point, according to certain non-limiting embodiments.
Figure 8B:
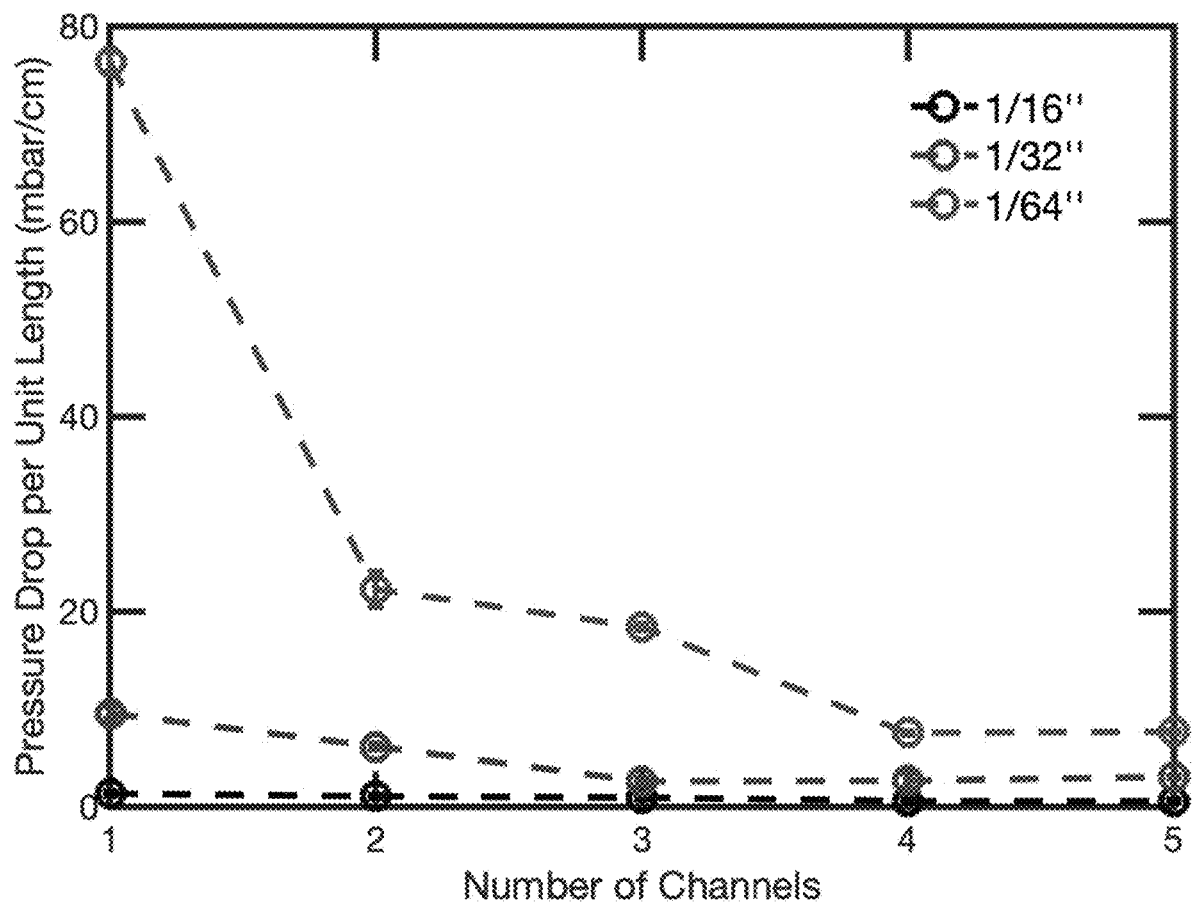
FIG. 8B shows the pressure drop per unit length as a function of the number channels in an electrode with channels of diameter 1/64", 1/32", and 1/16", according to certain non-limiting embodiments.

FIGS. 8A and 8B illustrate how the addition of channels may enhance performance of the electrodes. A cell was assembled with a single electrode present. A pressure gauge (SSI Technologies) with a resolution of 0.001 PSI was placed directly before the cell inlet and directly after the cell exit. Deionized water was pumped through the system using a syringe pump (Harvard Apparatus, PHD Ultra) and the pressure reading was allowed to stabilize for 30 seconds before a measurement was taken. Pressure readings were recorded in triplicate and using Darcy's law, the permeability was extracted using a linear regression of 1, 5, 10, 15, and 20 mL/min flow rates. FIG. 8A shows a plot of the average electrode permeability as the number of channels increases from 1 to 5 and as the size of the channels increases from 1/64" to 1/32" to 1/16". A larger channel diameter (e.g. 1/16") increases the average permeability of an electrode while a smaller channel (e.g. 1/64") has a lower average permeability when compared to larger diameter channels. In general, an increase in the number channels, regardless of diameter size, increase the average permeability. FIG. 8B plots the pressure drop per unit length as a function of the number channels, also including channels sizes 1/64" to 1/32" to 1/16". The pressure drop is typically smaller for larger diameter channels (e.g. 1/32" and 1/16" compared to smaller diameter 1/64") and the pressure drop decreases as the number of channels in the electrode increases.

Figure 9A:
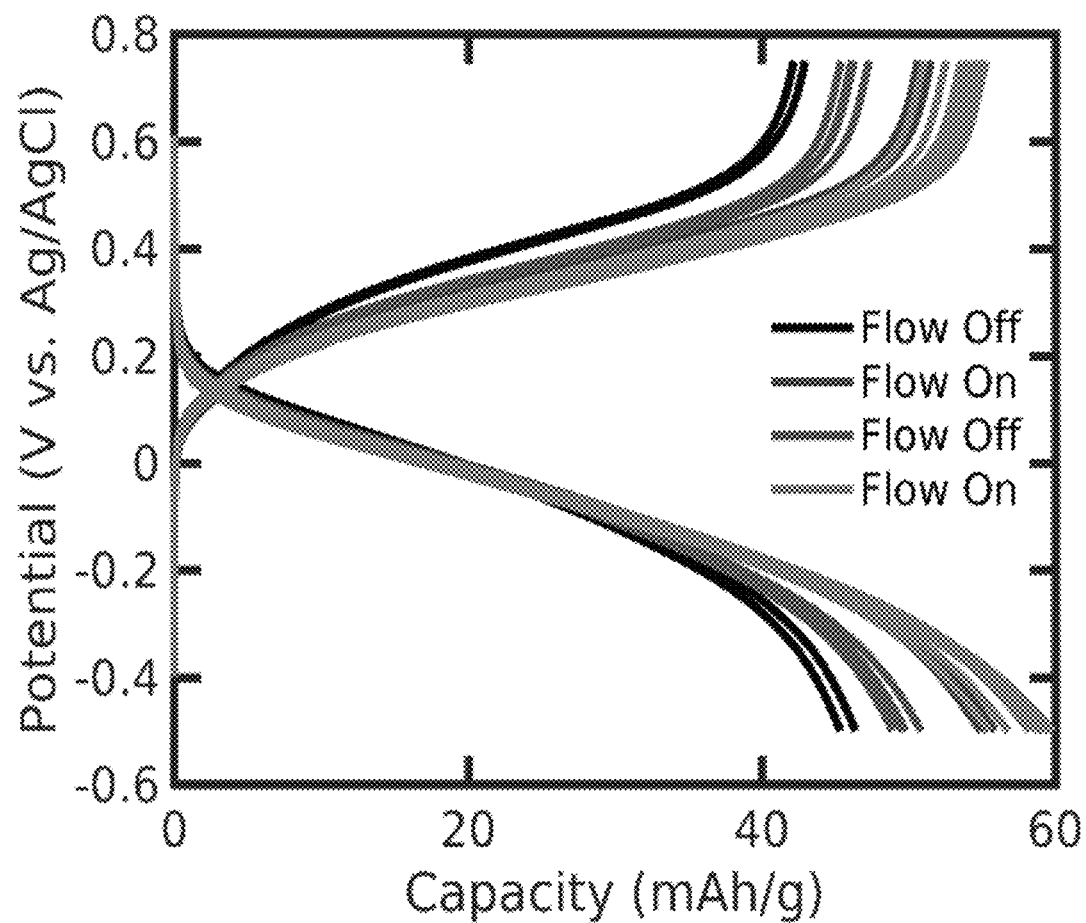
FIG. 9A shows the charge-discharge profiles of an electrode with two 1/32" channels, according to certain non-limiting embodiments.
Figure 9B:
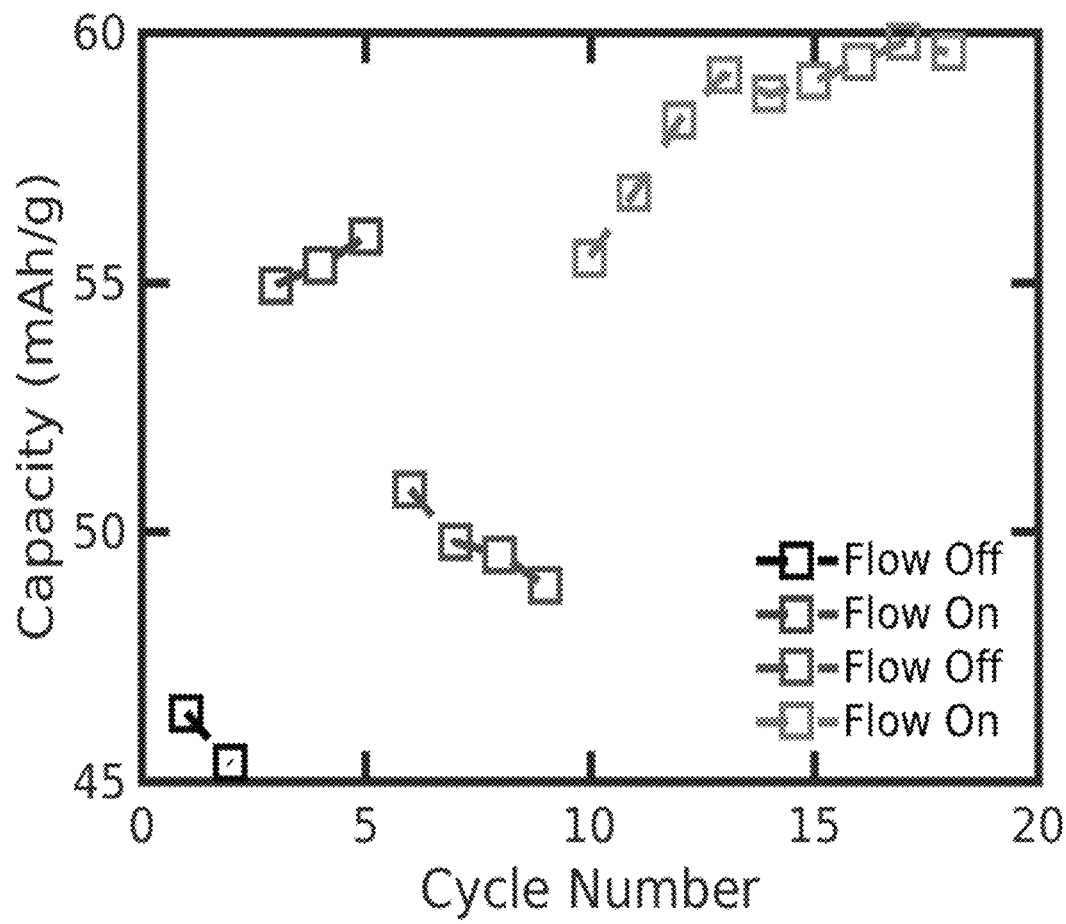
FIG. 9B shows a plot of capacity as a function of cycle number as the convection increases the accessible capacity of the structure with a flow rate set at 1 mL/min when on, according to certain non-limiting embodiments.

FIGS. 9A and 9B show electrochemical performance of an electrode with two 1/32" channels. FIG. 9A shows charge-discharge profiles of an electrode showing the effect of flow increasing the capacity and reducing the overpotential of the cell. FIG. 9B illustration how convection increases the accessible capacity of the structure. Flow was set to 1 mL/min when on.

Example 4: Non-Limiting Experimental Procedures

A First Non-Limiting Synthesis Method of an Electrode Composite Material.

A first non-limiting electrode composite material was synthesized by combining Prussian blue (Alfa Aesar) with TIMCAL conductive carbon black (MTI Corporation) and a poly(vinylidene fluoride) (PVDF, Sigma-Aldrich, average molecular weight 534,000) binder in a 2:1:1 mass ratio. PVDF (2.00 g) was dissolved into 25 mL of N-Methyl-2-pyrrolidone, biotech. grade, ≥99.7% (NMP, Sigma-Aldrich) contained within a 50 mL beaker using an ultrasonic processor (Sonics Vibra-Cell VCX 130). The sonicator utilized a 6 mm diameter VC50 probe pulsing at 40% amplitude and a rate of 10 seconds on to 10 seconds off for 1 hour. The electrode active material (4.00 g) was then added along with the conductive carbon black (2.00 g) and an additional 15 mL of NMP. The solution was manually mixed and then placed back into the ultrasonic processor for an additional 2 hours. Once completed, the solution was poured into an aluminum foil container and heated at 200° C. overnight to facilitate the NMP evaporation. The dried ink was ground using an agate mortar and pestle and filtered through a 150 µm (micron) sieve to ensure fine particle size.

A Second Non-limiting Synthesis Method of an Electrode Composite Material. A second non-limiting electrode composite material was synthesized by combining $LiNi_{1/3}Mn_{1/3}Co_{1/3}O_2$ (NMC, MTI Corporation) with TIMCAL conductive carbon black (MTI Corporation) and a poly(vinylidene fluoride) (PVDF, MTI Corporation, average molecular weight 600,000) binder in an 8:1:1 mass ratio. PVDF (1.00 g) was dissolved into 25 mL of N-Methyl-2-pyrrolidone, biotech. grade, ≥99.7% (NMP, Sigma-Aldrich) contained within a 50 mL beaker using an ultrasonic processor (Sonics Vibra-Cell VCX 130). The sonicator utilized a 6 mm diameter VC50 probe pulsing at 40% amplitude and a rate of 10 seconds on to 10 seconds off for 1 hour. The NMC active material (8.00 g) was added along with the conductive carbon black (1.00 g) and approximately 15 mL of NMP. The solution was manually mixed and then placed back into the ultrasonic processor for an additional 2 hours. Once completed, the solution was poured into an aluminum foil container and heated at 200° C. overnight to facilitate the NMP evaporation. The dried ink was ball milled using 10 mm agate balls and filtered through a 150 µm (micron) sieve to ensure fine particle size.

A Non-Limiting Method of Electrode Formation.

Non-limiting final electrodes were created by compacting the electrode ink of the first or second non-limiting electrode composite material inside a pressing die. The amount of powder placed in the die as well as the shape of the die were factors contributing to the final geometry of the non-limiting electrode. In a typical experiment, 3 grams of electrode composite material was placed in a 26 mm pressing die and compacted under 30,000 pounds of applied pressure within a hydraulic press (Carver Unit Model #3925) for five minutes. The final pellet geometry had a 25 mm diameter and thickness of 4 mm. In some instances, channels were formed by mechanically drilling holes through the pellet. Typically, an approximately 0.159 cm drill bit was used to drill 1-10 holes to form channels in the electrode.

Example 5: Non-limiting Convection Battery Cell

Two circular backing plates were machined from 12.5 mm thick polyacetal and/or polypropylene with six equidistant holes around the perimeter for bolt fastenings and a central opening for tube fittings. Current collectors were machined from 0.55 mm thick copper sheets and fitted with concentric Viton O-rings to prevent leakages. Flow fields with several central holes were machined from 6.5 mm thick graphite sheets. Non-limiting electrode pellets were fitted within 1.60 mm thick Viton gaskets. The non-limiting electrodes were then placed on either side of a polyacetal separator and sealed into a non-limiting cell. Tygon tubing (Saint-Gobain) with a 0.318 cm inner diameter and 0.635 cm outer diameter connected an electrolyte reservoir to the cell through fittings fastened within the polyacetal plates. Electrolyte was carried into the non-limiting cell through a peristaltic pump (Cole-Parmer Masterflex® L/S Series).

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrode for a convective battery, comprising:
   a composite mixture, comprising:
      a charge storage material;
      a conductive material; and
      a binder;
   wherein the electrode comprises a first side and a second side and, comprises a porous portion comprising a microporous portion having pores larger than 2 microns in size and less than 10 microns in size and two or more channels including at least a first channel and a second channel,
   wherein the two or more channels are closed on at least the first side or the second side,
   wherein the first channel is closed on the first side and the second channel is closed on the second side, and
   wherein the two or more channels have a diameter between 0.16 cm and 0.32 cm.

2. The electrode of claim 1, wherein the electrode has a thickness of between about 300 microns and about 5 cm.

3. An electrode for a convective battery as in claim 1, formed by a method comprising:
   providing a mixture comprising:
      a composite mixture comprising a charge storage material and a
   conductive material; and
   a pore-forming agent;
   compressing the mixture to form a compacted mixture; and
   forming an electrode from the compacted mixture, wherein the electrode comprises a first side and a second side and comprises a plurality of pores comprising a microporous portion having pores larger than 2 microns in size and less than 10 microns in size, and wherein the electrode has a thickness of at least about 300 microns.

4. An electrode for a convective battery as in claim 3, wherein the composite mixture further comprises a binder.

5. An electrode for a convective battery as in claim 3, formed by a method further comprising coating at least a portion of a surface of the electrode with a coating material.

6. An electrode for a convective battery as in claim 5, formed by a method wherein coating comprises depositing the coating material by electrodeposition.

7. An electrode for a convective battery as in claim 3, formed by a method further comprising annealing the composite mixture or the mixture.

8. An electrode for a convective battery as in claim 3, wherein the plurality of pores are formed by dissolving the pore-forming agent by passing a solution in which the pore-forming agent is soluble through the electrode.

9. An electrode for a convective battery as in claim 3, formed by a method further comprising forming-two or more channels in the electrode including at least a first channel and a second channel, wherein the two or more channels are closed on at least the first side or the second side, wherein the first channel is closed on the first side and the second channel is closed on the second side, and wherein the two or more channels has a diameter between 0.16 cm and 0.32 cm.

10. The electrode of claim 1, wherein the porous portion comprises a nanoporous portion.

11. The electrode of claim 1, wherein the binder is present in an amount between about 0.1 wt % and about 30 wt % versus the total weight of the composite mixture.

12. The electrode of claim 1, wherein:
   the charge storage material is present in an amount between about 40 wt % and about 60 wt % versus the total weight of the composite mixture;
   wherein the conductive material is present in an amount between about 20 wt % and about 30 wt % versus the total weight of the composite mixture; and
   the binder is present in an amount between about 20 wt % and about 30 wt % versus the total weight of the composite mixture.

13. The electrode of claim 1, wherein the electrode has a thickness of between about 300 microns and 5 cm, or between about 1 mm and about 10 mm, or between about 1 cm and about 5 cm.

14. The electrode of claim 1, wherein the two or more channels have an interdigitated architecture.

* * * * *